(12) United States Patent
Back et al.

(10) Patent No.: US 12,177,164 B2
(45) Date of Patent: Dec. 24, 2024

(54) METHOD FOR TRANSMITTING SIDELINK SIGNAL IN WIRELESS COMMUNICATION SYSTEM

(71) Applicant: LG ELECTRONICS INC., Seoul (KR)

(72) Inventors: Seoyoung Back, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 474 days.

(21) Appl. No.: 17/617,185

(22) PCT Filed: Jul. 30, 2020

(86) PCT No.: PCT/KR2020/010065
§ 371 (c)(1),
(2) Date: Dec. 7, 2021

(87) PCT Pub. No.: WO2021/020903
PCT Pub. Date: Feb. 4, 2021

(65) Prior Publication Data
US 2022/0345282 A1    Oct. 27, 2022

(30) Foreign Application Priority Data

Jul. 30, 2019  (KR) .......................... 10-2019-0092645
Aug. 12, 2019  (KR) .......................... 10-2019-0098027

(51) Int. Cl.
*H04L 5/00* (2006.01)

(52) U.S. Cl.
CPC ................................ *H04L 5/0094* (2013.01)

(58) Field of Classification Search
CPC ..... H04L 5/0094; H04L 5/0044; H04L 5/0098; H04W 4/40; H04W 72/04; H04W 92/18
See application file for complete search history.

(56) References Cited

U.S. PATENT DOCUMENTS

2018/0213549 A1* 7/2018 Kim ...................... H04L 5/0032
2022/0046617 A1* 2/2022 Sasaki ................... H04L 5/0094

FOREIGN PATENT DOCUMENTS

KR       1020190089062 A      7/2019

OTHER PUBLICATIONS

NEC. [Draft] TP for 38.213 alignment Cr. R1-1905986, 3GPP TSG RAN WG1 Meeting #97 (Year: 2019).*

(Continued)

*Primary Examiner* — Hardikkumar D Patel
(74) *Attorney, Agent, or Firm* — BRYAN CAVE LEIGHTON PAISNER LLP

(57) ABSTRACT

Provided is a method for a user device in a wireless communication system according to an aspect of the present disclosure in which: allocation information relating to a plurality of bandwidth parts (BWPs) is received, wherein the plurality of BWPs comprise a first BWP and a plurality of second BWPs comprised in the first BWP; a sidelink signal is transmitted on the first BWP on the basis of the activation of the first BWP; and the sidelink signal is transmitted on at least one second BWP on the basis of the activation of the at least one second BWP among the plurality of second BWPs. The allocation information comprises: the start point of the first BWP and the plurality of second BWPs; the size of the first BWP and the plurality of second BWPs; and the gap among the plurality of second BWPs. Each of the plurality of second BWPs is allocated within the first BWP from the start point in the gap unit on a frequency domain.

14 Claims, 37 Drawing Sheets

(56) References Cited

OTHER PUBLICATIONS

LG Electronics, R1-1907012, 3GPP TSG RAN WG1 Meeting #97 (Year: 2019).*

NEC, "[Draft] TP for 38.213 alignment CR", 3GPP TSG RAN WG1 Meeting #97, May 13-17, 2019, R1-1905986.

LG Electronics, "Discussion on physical layer structure for NR sidelink", 3GPP TSG RAN WG1 #97, May 13-17, 2019, R1-1907012.

ZTE, Sanechips, "Overall consideration on NR V2X resource allocation", 3GPP TSG-RAN WG2 #104, Nov. 12-16, 2018, R2-1816981.

Samsung, "BWP Aspects of SL and UU Prioritisation", 3GPP TSG-RAN2 106, May 13-17, 2019, R2-1905723.

* cited by examiner (a)

(b)

(a)

(b)

(a)

(b)

METHOD FOR TRANSMITTING SIDELINK SIGNAL IN WIRELESS COMMUNICATION SYSTEM

This application is the National Stage filing under 35 U.S.C. 371 of International Application No. PCT/KR2020/010065 filed on Jul. 30, 2020, which claims priority to Korean Patent Application Nos. 10-2019-0092645 filed on Jul. 30, 2019 and 10-2019-0098027 filed on Aug. 12, 2019, the contents of which are all hereby incorporated by reference herein in their entirety.

TECHNICAL FIELD

The present disclosure relates to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

Various embodiments of the present disclosure may provide a method of transmitting and receiving a signal and an apparatus supporting the same in a wireless communication system.

Specifically, various embodiments of the present disclosure may provide a method of allocating a plurality of bandwidth parts (BWPs) to a user equipment (UE) and an apparatus supporting the same in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal and an apparatus supporting the same in a wireless communication system.

According to an aspect of the present disclosure, a method of a user equipment (UE) in a wireless communication system includes receiving allocation information about a plurality of bandwidth parts (BWPs), the plurality of BWPs including a first BWP and a plurality of second BWPs included in the first BWP, based on the first BWP being activated, transmitting a sidelink signal in the first BWP, and based on at least one of the plurality of second BWPs being activated, transmitting the sidelink signal in the at least one second BWP. The allocation information includes start points of the first BWP and the plurality of second BWPs, sizes of the first BWP and the plurality of second BWPs, and a gap between the plurality of second BWPs, and each of the plurality of second BWPs is allocated at an interval of the gap from the start point of the second BWP in a frequency domain within the first BWP.

The method may further include receiving information about a resource pool for transmission of the sidelink signal, and the resource pool may be repeated periodically in a time domain.

Based on the first BWP being activated, a frequency-domain size of the resource pool may be equal to a frequency-domain size of the first BWP, and based on the second BWP being activated, a frequency-domain size of the resource pool may be equal to a frequency-domain size of the second BWP.

The first BWP may include a first sub-channel group, and each of the plurality of second BWPs may include a second sub-channel group. Each of the first sub-channel group and the second sub-channel group may include a plurality of sub-channels.

The allocation information may include the number of sub-channels included in the first sub-channel group, and the number of sub-channels included in the second sub-channel group.

The number of sub-channels included in the first sub-channel group may be equal to the number of sub-channels included in the second sub-channel group.

According to another aspect of the present disclosure, an apparatus for a UE in a wireless communication system includes at least one processor, and at least one memory operably coupled to the at least one processor and storing instructions which cause the at least one processor to perform operations. The operations include receiving allocation information about a plurality of BWPs, the plurality of BWPs including a first BWP and a plurality of second BWPs included in the first BWP, based on the first BWP being activated, transmitting a sidelink signal in the first BWP, and based on at least one of the plurality of second BWPs being activated, transmitting the sidelink signal in the at least one second BWP. The allocation information includes start points of the first BWP and the plurality of second BWPs, sizes of the first BWP and the plurality of second BWPs, and a gap between the plurality of second BWPs. Each of the plurality of second BWPs is allocated at an interval of the gap from the start point of the second BWP in a frequency domain within the first BWP.

The operations may further include receiving information about a resource pool for transmission of the sidelink signal, and the resource pool may be repeated periodically in a time domain.

Based on the first BWP being activated, a frequency-domain size of the resource pool may be equal to a frequency-domain size of the first BWP, and based on the second BWP being activated, a frequency-domain size of the resource pool may be equal to a frequency-domain size of the second BWP.

The first BWP may include a first sub-channel group, and each of the plurality of second BWPs may include a second sub-channel group. Each of the first sub-channel group and the second sub-channel group may include a plurality of sub-channels.

The allocation information may include the number of sub-channels included in the first sub-channel group, and the number of sub-channels included in the second sub-channel group.

The UE may be an autonomous driving vehicle or may be included in an autonomous driving vehicle.

According to another aspect of the present disclosure, a processor performs operations for a UE in a wireless communication system, and the operations include receiving allocation information about a plurality of BWPs, the plurality of BWPs including a first BWP and a plurality of second BWPs included in the first BWP, based on the first BWP being activated, transmitting a sidelink signal in the first BWP, and based on at least one of the plurality of second BWPs being activated, transmitting the sidelink signal in the at least one second BWP. The allocation information includes start points of the first BWP and the plurality of second BWPs, sizes of the first BWP and the plurality of second BWPs, and a gap between the plurality of second BWPs. Each of the plurality of second BWPs is allocated at an interval of the gap from the start point of the second BWP in a frequency domain within the first BWP.

According to another aspect of the present disclosure, a computer-readable storage medium stores at least one computer program including at least one instruction which, when executed by at least one processor, causes the at least one processor to perform operations for a UE, and the operations include receiving allocation information about a plurality of BWPs, the plurality of BWPs including a first BWP and a plurality of second BWPs included in the first BWP, based on the first BWP being activated, transmitting a sidelink signal in the first BWP, and based on at least one of the plurality of second BWPs being activated, transmitting the sidelink signal in the at least one second BWP. The allocation information includes start points of the first BWP and the plurality of second BWPs, sizes of the first BWP and the plurality of second BWPs, and a gap between the plurality of second BWPs. Each of the plurality of second BWPs is allocated at an interval of the gap from the start point of the second BWP in a frequency domain within the first BWP.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

The embodiments of the present disclosure have the following effects.

According to various embodiments of the present disclosure, a method of allocating a plurality of bandwidth parts (BWPs) to a user equipment (UE) and an apparatus supporting the same in a wireless communication system may be provided.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
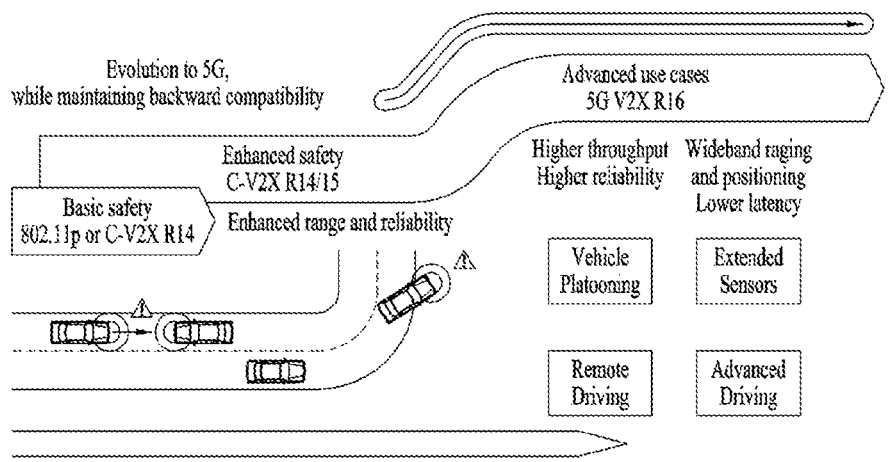
FIG. 1 is a diagram illustrating vehicle-to-everything (V2X) communication based on pre-new radio access technology (NR) RAT and V2X communication based on NR in comparison.
Figure 2:
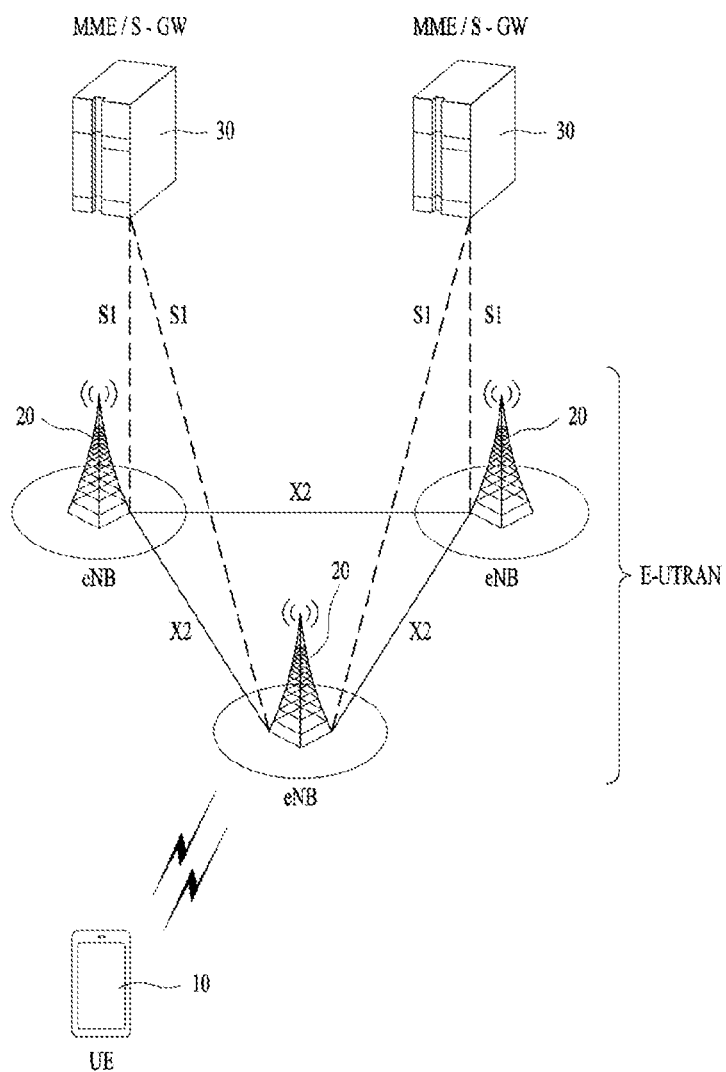
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
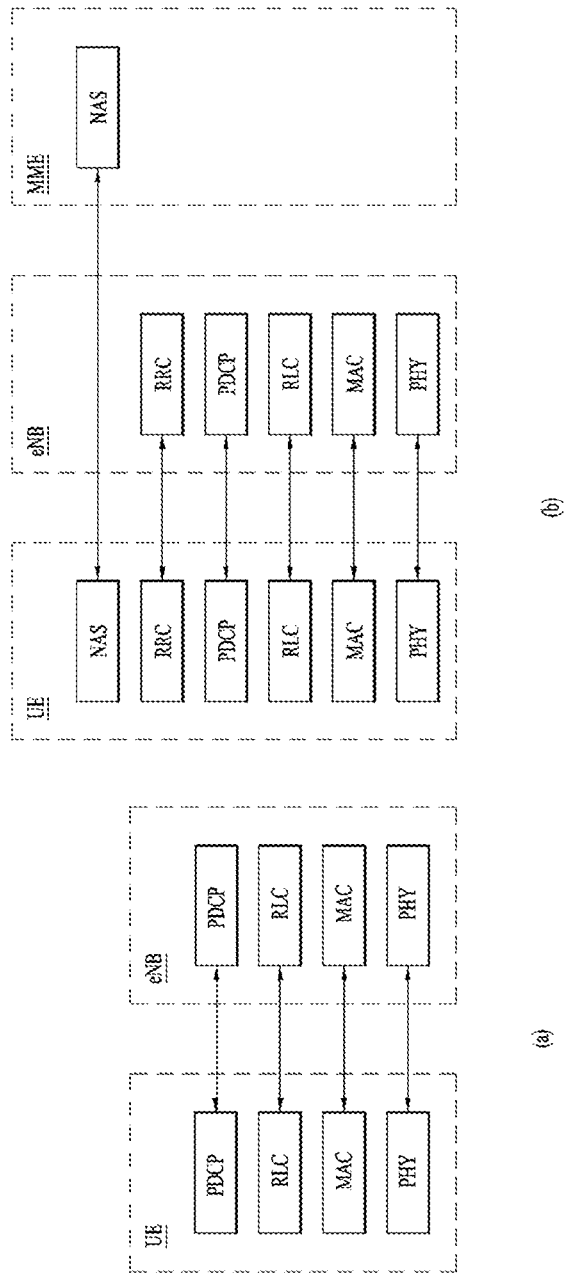
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB).

The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
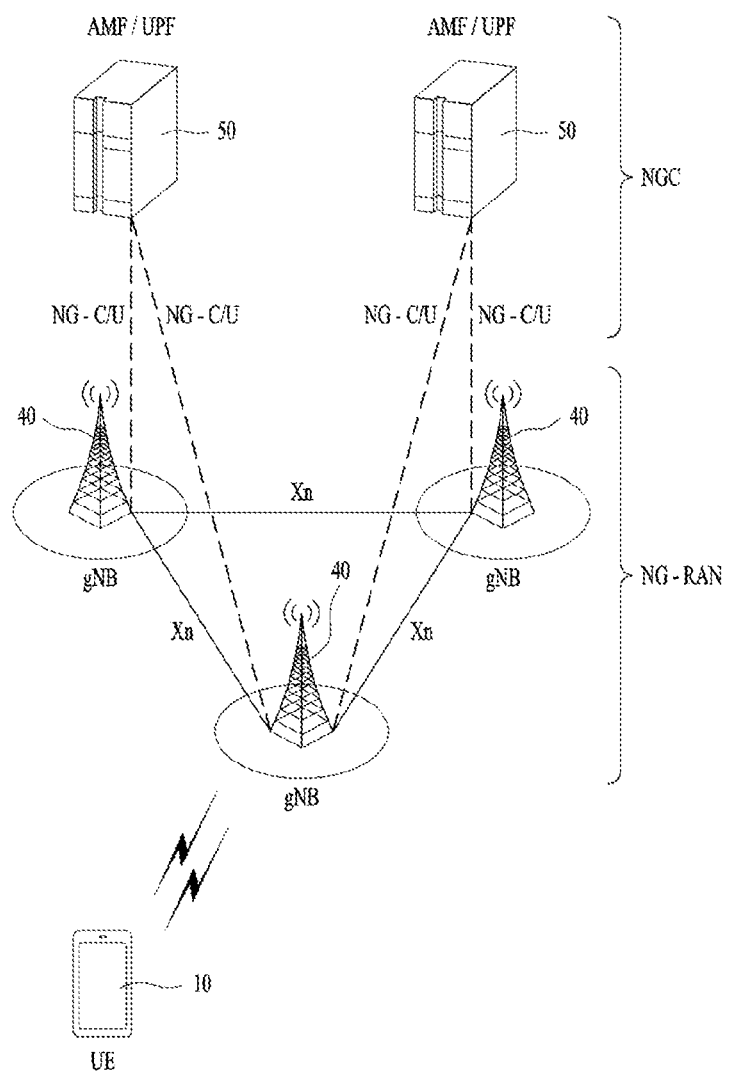
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
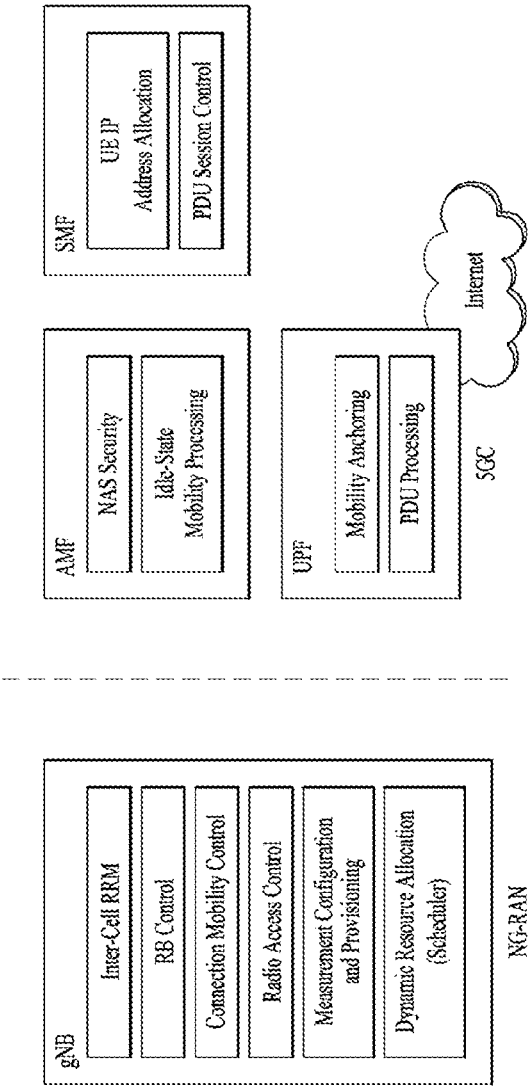
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
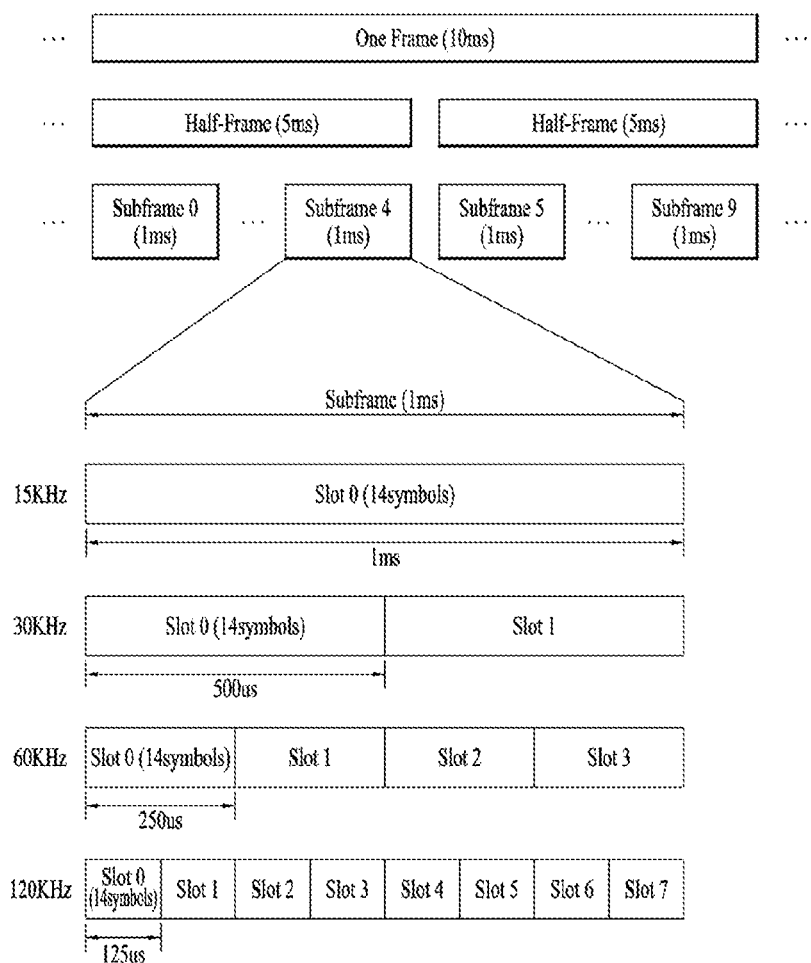
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
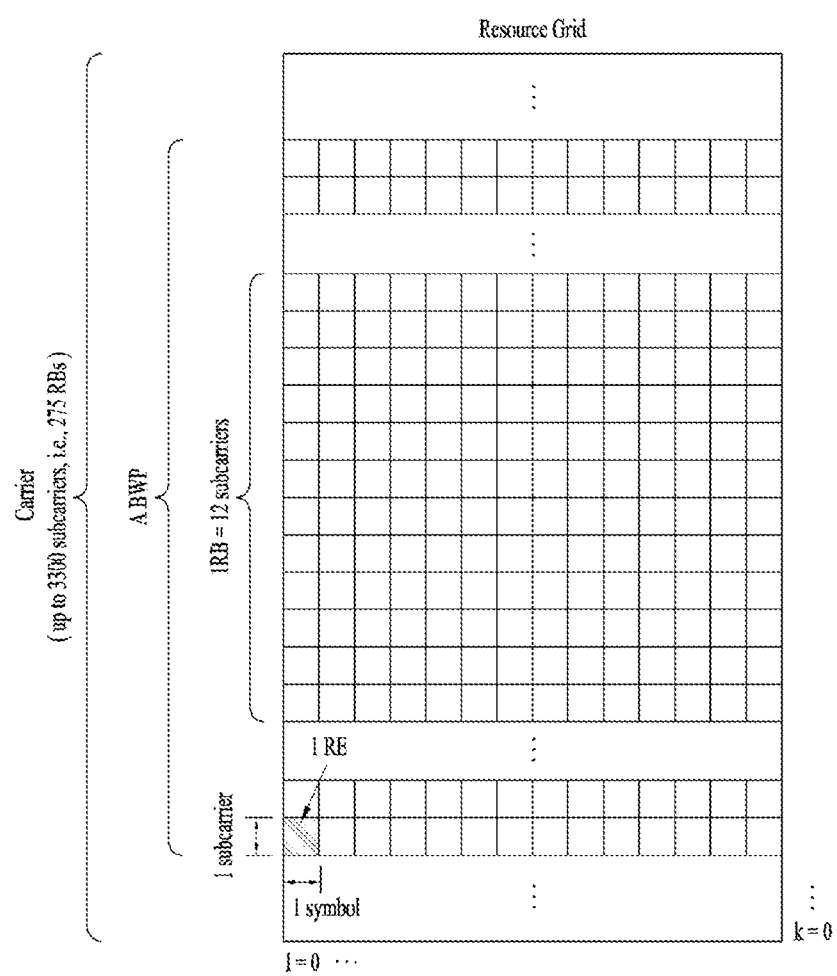
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
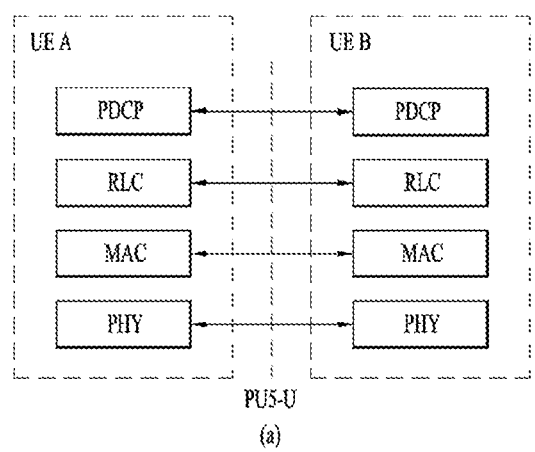
FIG. 8 is a diagram illustrating radio protocol architectures for sidelink (SL) communication according to an embodiment of the present disclosure.
Figure 8:
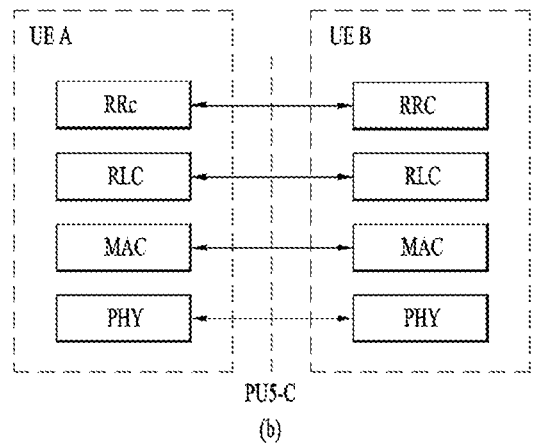

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
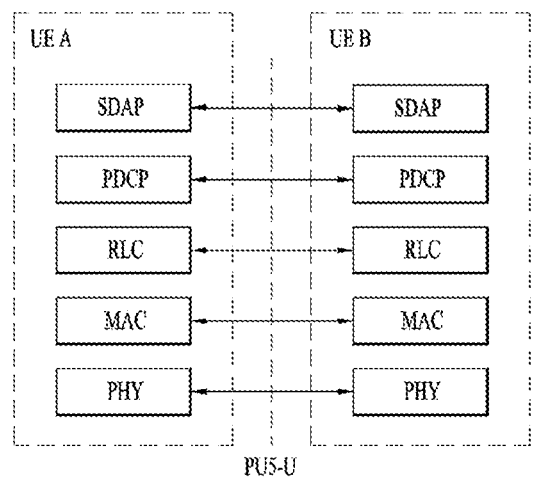
FIG. 9 is a diagram illustrating radio protocol architectures for SL communication according to an embodiment of the present disclosure.
Figure 9:
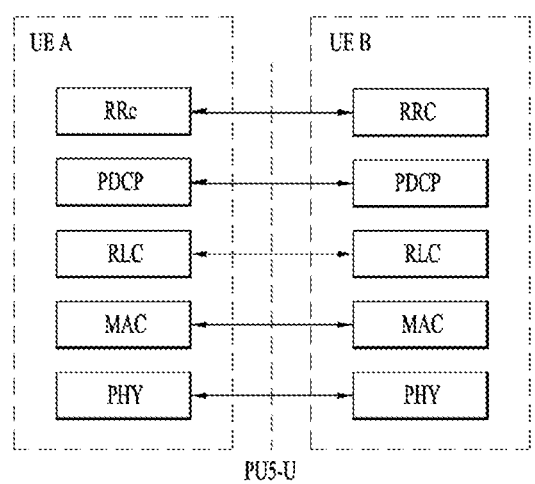

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 10:
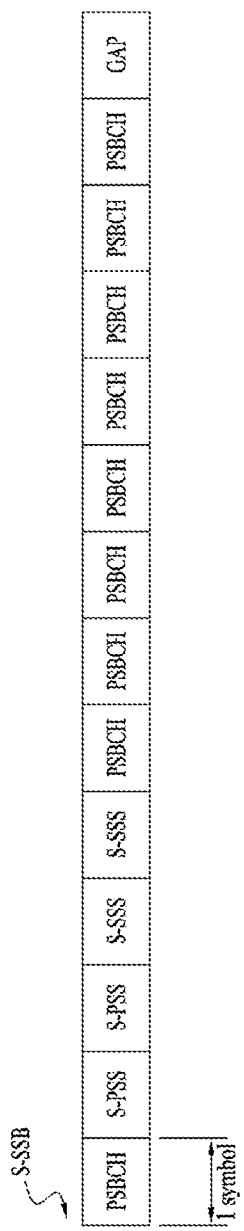
FIG. 10 is a diagram illustrating the structure of a secondary synchronization signal block (S-SSB) in a normal cyclic prefix (NCP) case according to an embodiment of the present disclosure.

FIG. 10 illustrates the structure of an S-SSB in an NCP case according to an embodiment of the present disclosure.

For example, when the CP type is NCP, FIG. 10 may be referred to for the structure of the S-SSB, that is, the order of symbols to which the S-PSS, S-SSS and PSBCH are mapped in the S-SSB transmitted by the transmitting UE.

Figure 11:
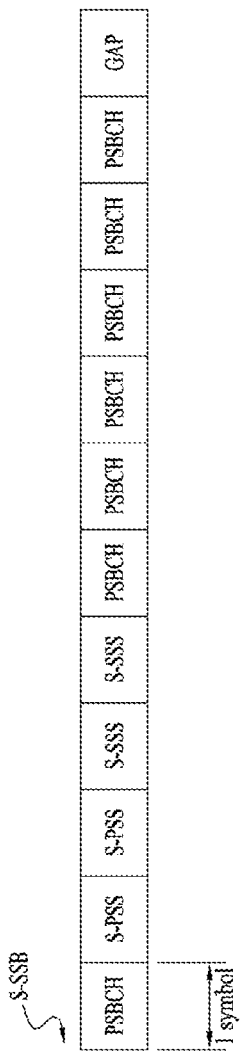
FIG. 11 is a diagram illustrating the structure of an S-SSB in an extended cyclic prefix (ECP) case according to an embodiment of the present disclosure.

FIG. 11 illustrates the structure of an S-SSB in an ECP case according to an embodiment of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

Figure 12:
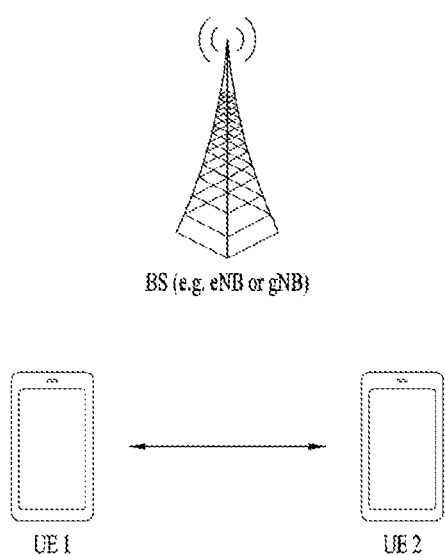
FIG. 12 is a diagram illustrating user equipments (UEs) which conduct V2X or SL communication between them according to an embodiment of the present disclosure.

FIG. 12 illustrates UEs that conduct V2X or SL communication between them according to an embodiment of the present disclosure.

Referring to FIG. 12, the term "UE" in V2X or SL communication may mainly refer to a terminal of a user. However, when network equipment such as a BS transmits and receives a signal according to a UE-to-UE communication scheme, the BS may also be regarded as a kind of UE.

For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 13:
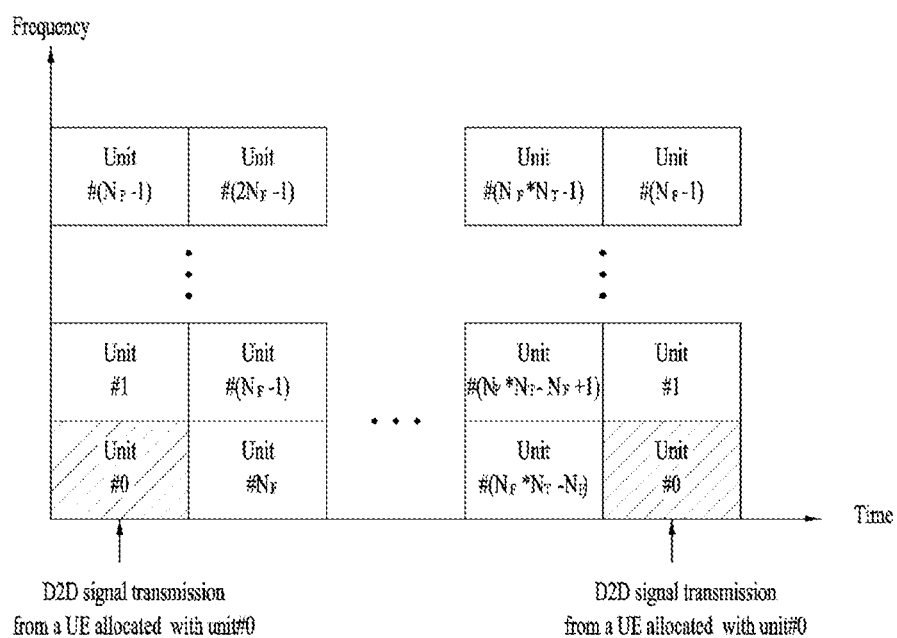
FIG. 13 is diagram illustrating resource units for V2X or SL communication according to an embodiment of the present disclosure.

FIG. 13 illustrates resource units for V2X or SL communication according to an embodiment of the present disclosure.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 14:
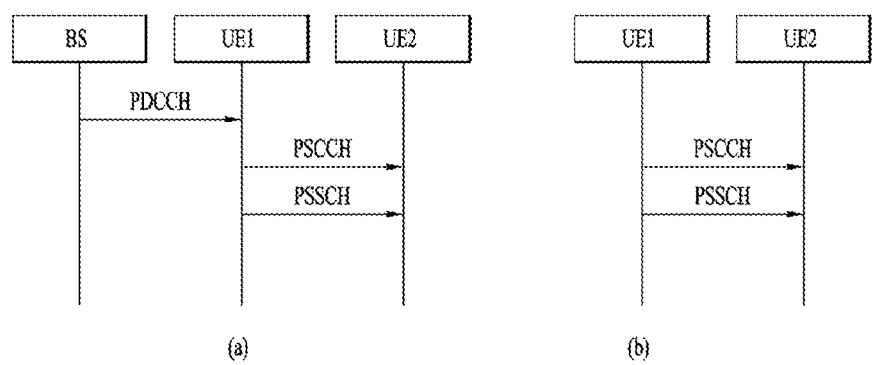
FIG. 14 is a diagram illustrating signal flows for V2X or SL communication procedures of a UE according to transmission modes according to an embodiment of the present disclosure.

FIG. 14 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 14 (a) illustrates a UE operation related to LTE transmission mode 1 or LTE transmission mode 3. Alternatively, for example, FIG. 14 (a) illustrates a UE operation related to NR resource allocation mode 1. For example, LTE transmission mode 1 may be applied to general SL communication, and LTE transmission mode 3 may be applied to V2X communication.

For example, FIG. 14(b) illustrates a UE operation related to LTE transmission mode 2 or LTE transmission mode 4. Alternatively, for example, FIG. 14(b) illustrates a UE operation related to NR resource allocation mode 2.

Referring to FIG. 14(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 14 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a sub-channel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more sub-channels and/or slots used by the UE to another UE by SCI. For example, the UE may indicate one or more sub-channels and/or slots reserved for PSSCH (re)transmission by the UE to another UE by SCI. For example, a minimum allocation unit of SL resources may be a slot. For example, the size of a sub-channel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Carrier reselection will be described below.

In V2X communication or SL communication, a UE may perform carrier reselection based on the channel busy ratios (CBRs) of configured carriers and/or the ProSe per-packet priority (PPPP) of a V2X message to be transmitted. For example, the MAC layer of the UE may be responsible for the carrier reselection. In various embodiments of the present disclosure, the term PPPP may be interchangeably used with ProSe per-packet reliability (PPPR). For example, as a PPPP value is smaller, this may mean a higher priority, and as the PPPP value is larger, this may mean a lower priority. For example, as a PPPR value is smaller, this may mean higher reliability, and as the PPPR value is larger, this may mean lower reliability. For example, a PPPP value related to a service, packet or message with a higher priority may be less than a PPPP value related to a service, packet or message with a lower priority. For example, a PPPR value related to a service, packet or message with higher reliability may be less than a PPPR value related to a service, packet or message with lower reliability.

A CBR may refer to the portion of sub-channels in a resource pool, of which the SL-received signal strength indicator (S-RSSI) measured by the UE is sensed as exceeding a predetermined threshold. There may be a PPPP related to each logical channel, and the configuration of the PPPP value should reflect latency requirements of both the UE and the BS. During carrier reselection, the UE may select one or more of candidate carriers in an ascending order from the lowest CBR.

Now, RRC connection establishment between UEs will be described.

For V2X communication or SL communication, a transmitting UE (TX-UE) may need to establish a (PC5) RRC connection with a receiving UE (RX-UE). For example, the UE may obtain a V2X-specific SIB. When at least a frequency configured for transmission in SL communication is included in the V2X-specific SIB, for a UE having data to be transmitted, which is configured with V2X or SL transmission by a higher layer, the UE may establish an RRC connection with another UE without including a transmission resource pool for the frequency. For example, once the RRC connection is established between the TX-UE and the RX-UE, the TX-UE may perform unicast communication with the RX-UE via the established RRC connection.

When the RRC connection is established between the UEs, the TX-UE may transmit an RRC message to the RX-UE.

Figure 15:
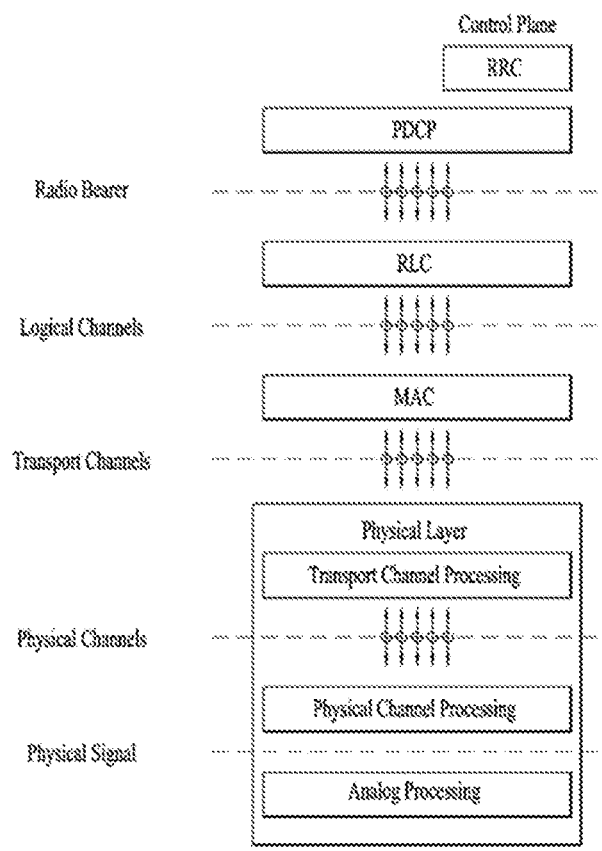
FIG. 15 is a diagram illustrating a procedure of transmitting a radio resource control (RRC) message according to an embodiment of the present disclosure.

FIG. 15 illustrates a procedure of transmitting an RRC message according to an embodiment of the present disclosure.

Referring to FIG. 15, an RRC message generated by a transmitting UE may be delivered to the PHY layer via the PDCP layer, the RLC layer, and the MAC layer. The RRC message may be transmitted through a signaling radio bearer (SRB). The PHY layer of the transmitting UE may subject the received information to encoding, modulation, and antenna/resource mapping, and the transmitting UE may transmit the information to a receiving UE.

The receiving UE may subject the received information to antenna/resource demapping, demodulation, and decoding. The information may be delivered to the RRC layer via the MAC layer, the RLC layer, and the PDCP layer. Therefore, the receiving UE may receive the RRC message generated by the transmitting UE.

V2X or SL communication may be supported for a UE in RRC_CONNECTED mode, a UE in RRC_IDLE mode, and a UE in (NR) RRC_INACTIVE mode. That is, the UE in the RRC_CONNECTED mode, the UE in the RRC_IDLE mode and the UE in the (NR) RRC_INACTIVE mode may perform V2X or SL communication. The UE in the RRC_INACTIVE mode or the UE in the RRC_IDLE mode may perform V2X or SL communication by using a cell-specific configuration included in a V2X-specific SIB.

The RRC may be used to exchange at least a UE capability and an AS layer configuration. For example, UE1 may transmit its UE capability and AS layer configuration to UE2, and receive a UE capability and an AS layer configuration of UE2 from UE2. For UE capability delivery, an information flow may be triggered during or after PC5-S signaling for direct link setup.

SL measurement and reporting will be described below.

For the purpose of QoS prediction, initial transmission parameter setting, link adaptation, link management, admission control, and so on, SL measurement and reporting (e.g., measurement and reporting of an RSRP or an RSRQ) between UEs may be considered in SL. For example, an RX-UE may receive an RS from a TX-UE and measure the channel state of the TX-UE based on the RS. Further, the RX-UE may report CSI to the TX-UE. SL measurement and reporting may include measurement and reporting of a CBR and reporting of location information. Examples of CSI for V2X may include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and so on. For unicast communication, a CQI, an RI, and a PMI or some of them may be supported in a non-subband-based aperiodic CSI report based on the assumption of four or fewer antenna ports. The CSI procedure may not depend on a standalone RS. CSI reporting may be activated and deactivated depending on a configuration.

For example, the TX-UE may transmit a channel state information-reference signal (CSI-RS) to the RX-UE, and the RX-UE may measure a CQI or an RI using the CSI-RS. For example, the CSI-RS may be referred to as an SL CSI-RS. For example, the CSI-RS may be confined to within a PSSCH transmission. For example, the TX-UE may transmit the CSI-RS in a PSSCH resource to the RX-UE.

A BWP and a resource pool will be described below.

When bandwidth adaptation (BA) is used, the reception bandwidth and transmission bandwidth of a UE need not be as large as the bandwidth of a cell, and may be adjusted. For example, the network/BS may inform the UE of the bandwidth adjustment. For example, the UE may receive information/a configuration for bandwidth adjustment from the network/BS. In this case, the UE may perform bandwidth adjustment based on the received information/configuration. For example, the bandwidth adjustment may include a decrease/increase of the bandwidth, a change in the position of the bandwidth, or a change in the SCS of the bandwidth.

For example, the bandwidth may be reduced during a time period of low activity in order to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow a different service. A subset of the total cell bandwidth of a cell may be referred to as a BWP. BA may be implemented by configuring BWPs for the UE and indicating a current active BWP among the configured BWPs to the UE by the BS/network.

Figure 16:
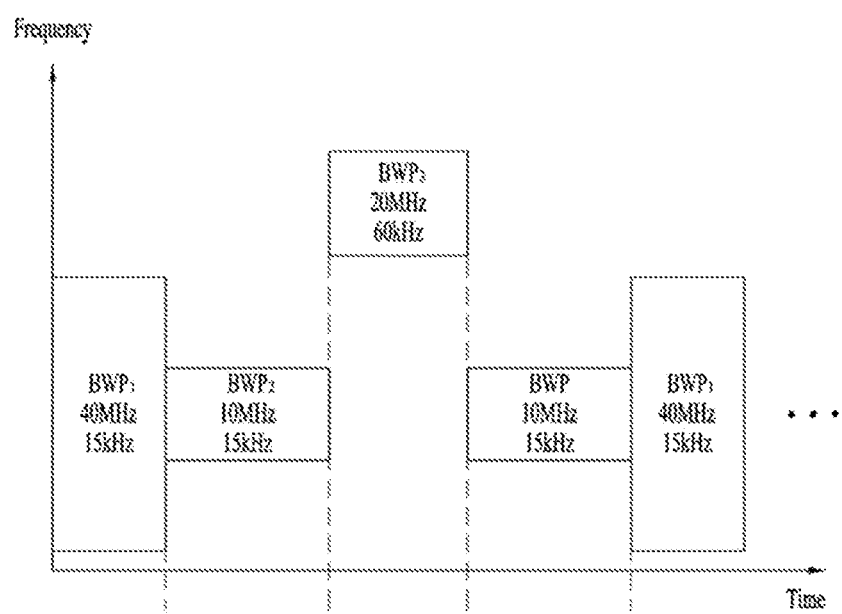
FIG. 16 is a diagram illustrating a plurality of bandwidth parts (BWPs) according to an embodiment of the present disclosure.

FIG. 16 illustrates a plurality of BWPs according to an embodiment of the present disclosure.

Referring to FIG. 16, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 17:
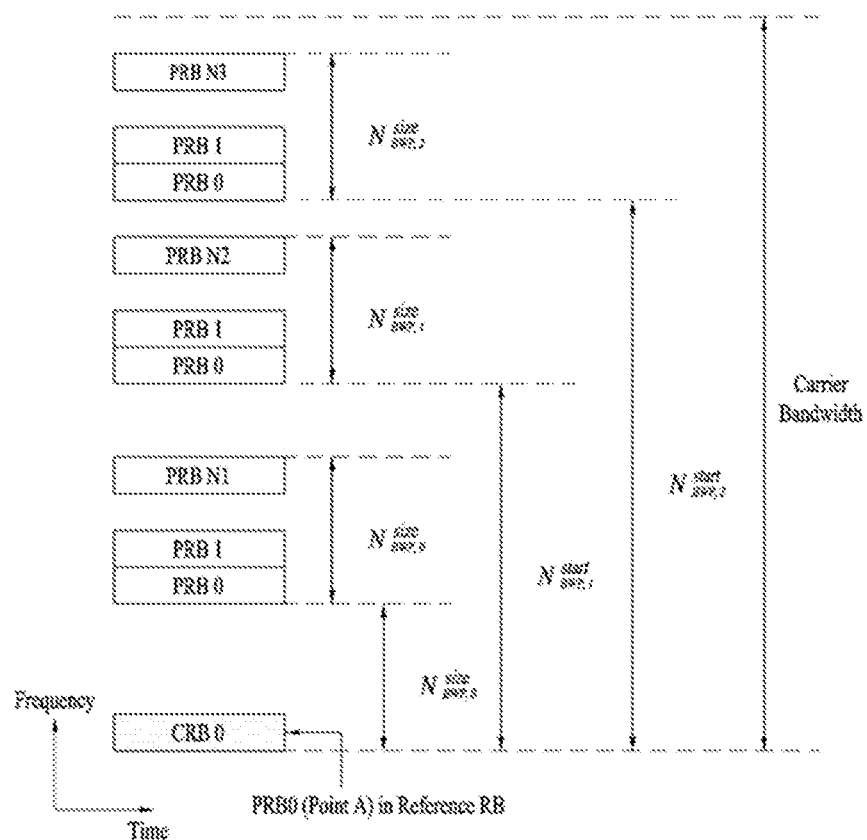
FIG. 17 is a diagram illustrating a BWP according to an embodiment of the present disclosure.
Figure 30:
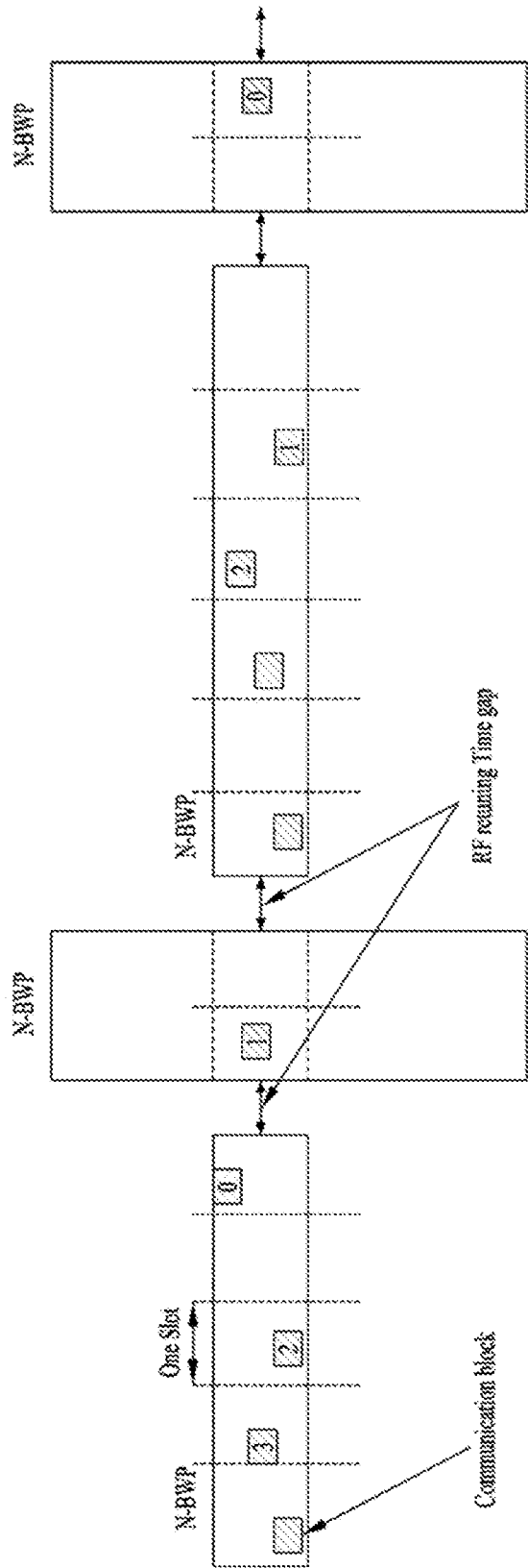
FIG. 30 is a diagram illustrating a method of configuring a radio frequency (RF) retuning time gap according to an embodiment of the present disclosure.

FIG. 17 illustrates BWPs according to an embodiment of the present disclosure. In the embodiment of FIG. 30, it is assumed that there are three BWPs.

Referring to FIG. 17, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset NstartBWP from the point A, and a bandwidth NsizeBWP. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 18:
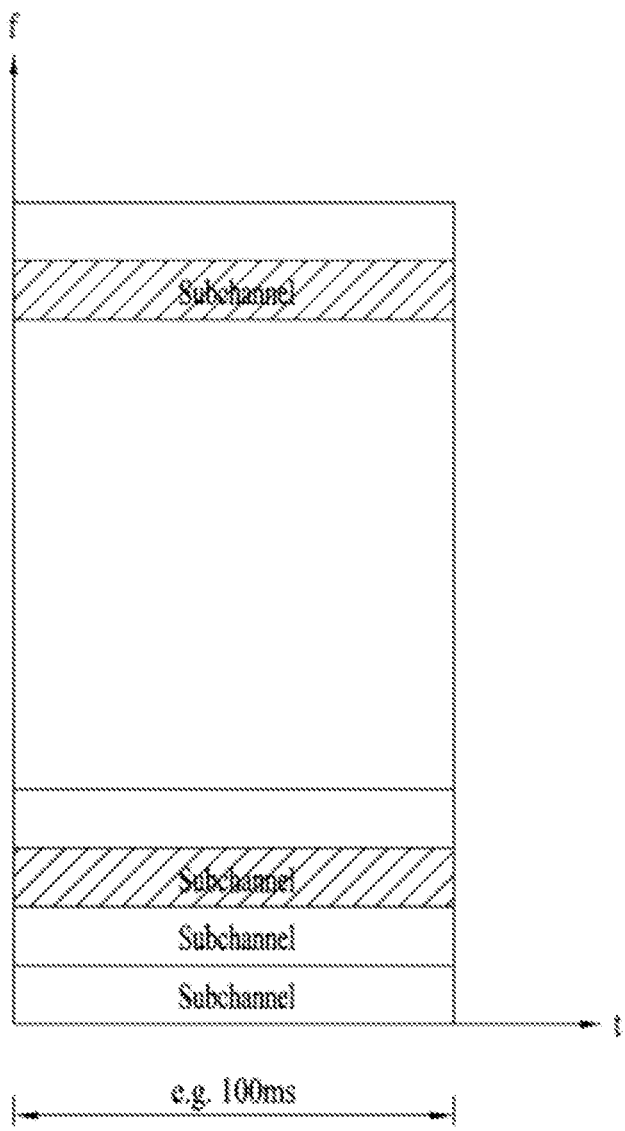
FIG. 18 is a diagram illustrating a resource unit for channel busy ratio (CBR) measurement according to an embodiment of the present disclosure.

FIG. 18 illustrates resource units for CBR measurement according to an embodiment of the present disclosure.

Referring to FIG. 18, a CBR may refer to the number of sub-channels of which the RSSI measurements are equal to or larger than a predetermined threshold as a result of measuring an RSSI in each sub-channel during a specific period (e.g., 100 ms) by a UE. Alternatively, a CBR may refer to a ratio of sub-channels having values equal to or greater than a predetermined threshold among sub-channels during a specific period. For example, in the embodiment of FIG. 18, on the assumption that the hatched sub-channels have values greater than or equal to a predetermined threshold, the CBR may refer to a ratio of hatched sub-channels for a time period of 100 ms. In addition, the UE may report the CBR to the BS.

Figure 19:
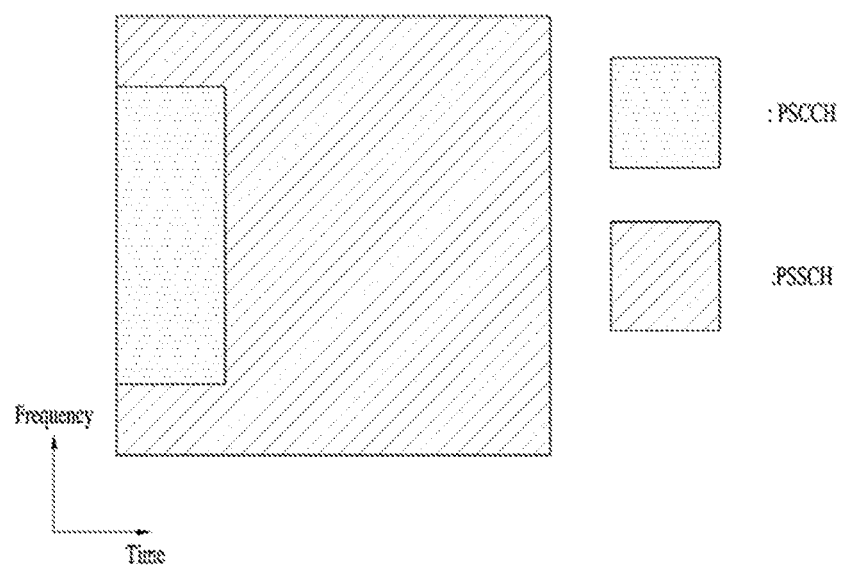
FIG. 19 is a diagram illustrating exemplary multiplexing between a physical sidelink control channel (PSCCH) and a physical sidelink shared channel (PSSCH)

For example, when a PSCCH and a PSSCH are multiplexed as illustrated in the embodiment of FIG. 19, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

In an NR system, up to four BWPs each representing a continuous set of RBs may be allocated to a UE, and one of the four BWPs may be activated and used. Each BWP may be configured with a different numerology (e.g., SCS, TTI, and so on). In the present disclosure, however, multiple BWPs as well as a single BWP may be activated for use in efficient communication in consideration of a different capability and power consumption of each UE.

1. Method of Allocating Multiple BWPs

Each UE may have a different bandwidth capability for signal transmission and reception. When a UE capable of covering a wider bandwidth should communicate with a UE capable of covering only a narrower bandwidth, the UE should be able to allocate an appropriate BWP and resource for the communication. Alternatively, when the UE having a wider bandwidth capability communicates with a plurality of UEs in narrower bandwidths to save power, how to allocate BWPs and resources may become an issue.

Figure 20:
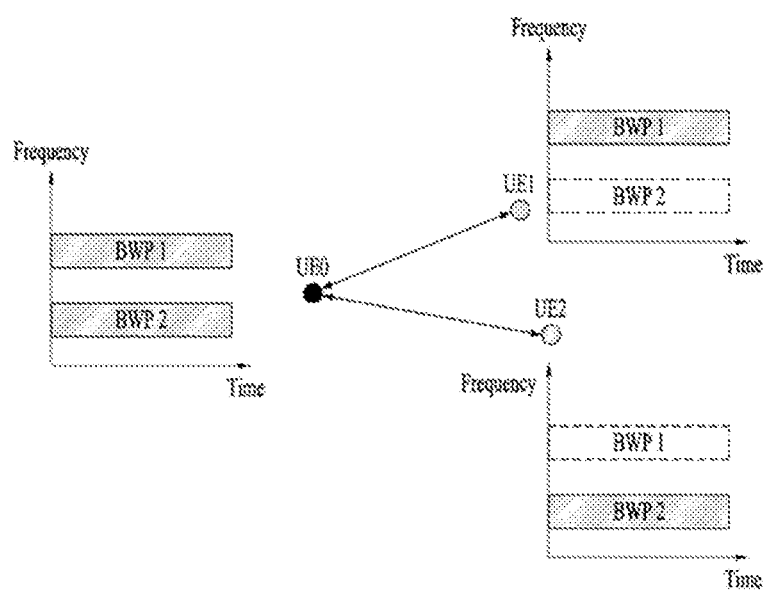
FIG. 20 is a diagram illustrating SL communication in a plurality of active BWPs.

FIG. 20 is a diagram illustrating SL communication in a plurality of active BWPs.

Referring to FIG. 20, UE 0 may activate a plurality of BWPs and perform unicast communication with UE 1 and UE 2 in the activated BWPs, respectively. Although UE 1 and UE 2 have a wide BWP (W-BWP) capability, only some narrow BWPs (N-BWPs) may be used for communication among the activated BWPs to reduce power consumption, compared to activation and use of all of the BWPs. That is, when a W-BWP is activated, UE 0 to UE 2 may perform SL signal transmission and reception in the W-BWP, and when N-BWPs are activated, UE 0 to UE 2 may perform SL signal transmission and reception in the activated N-BWPs. This UE operation may be useful for a small-sized terminal such as a smartphone in terms of power consumption. That is, when UE 1 and UE 2 are small-sized terminals such as smartphones, UE 1 and UE 2 may activate and use only some N-BWPs, thereby achieving in a gain in terms of power consumption. When UEs communicate with each other in N-BWPs as described above, how to arrange BWPs or configure a gap between the BWPs in arrangement/allocation of BWPs and resources may become an issue.

In the present disclosure, multiple-BWPs (M-BWPs) refer to a plurality of BWPs allocated to or configured for a UE. The UE may select at least one of the M-BWPs. When the UE uses the plurality of BWPs in FDM, the UE may perform filtering each BWP at an RF end, and thus need an appropriate frequency gap between the M-BWPs. Hereinbelow, various embodiments of the present disclosure disclose methods of indicating M-BWPs including a frequency gap for the case in which a plurality of BWPs are allocated within one resource pool and the case in which a resource pool is configured in each BWP. Further, according to various embodiments of the present disclosure, a UE may use a different method of sensing/selecting valid resources for use in a data transmission.

1-1. Case of Allocating Multiple BWPs in One Resource Pool

According to an embodiment of the present disclosure, when allocating BWPs to a UE, a gNB may indicate BWP allocation information such as {BWP_start, BWP_size, inter_BWP_gap} to the UE. BWP_start may be information indicating the frequency-domain start point of a BWP in a single resource pool, BWP_size may be information indicating the frequency-domain size of the BWP in the single resource pool, and inter_BWP_gap may be information indicating the frequency-domain size of a gap between BWPs in the single resource pool.

Specifically, when a plurality of BWPs are allocated, BWP_start, that is, information about the start point of a BWP may indicate the frequency start point of a BWP allocated to a lowest frequency area in the frequency domain among the plurality of BWPs. Therefore, according to the allocation information, the plurality of BWPs may be sequentially allocated at intervals of the gap in the frequency domain, starting from the given start point. BWP allocation information may be given separately for a W-BWP and each N-BWP. As described later, N-BWPs may be included in the W-BWP.

FIG. 21 is a diagram illustrating a BWP configuration method according to an embodiment of the present disclosure.

Figure 21A:
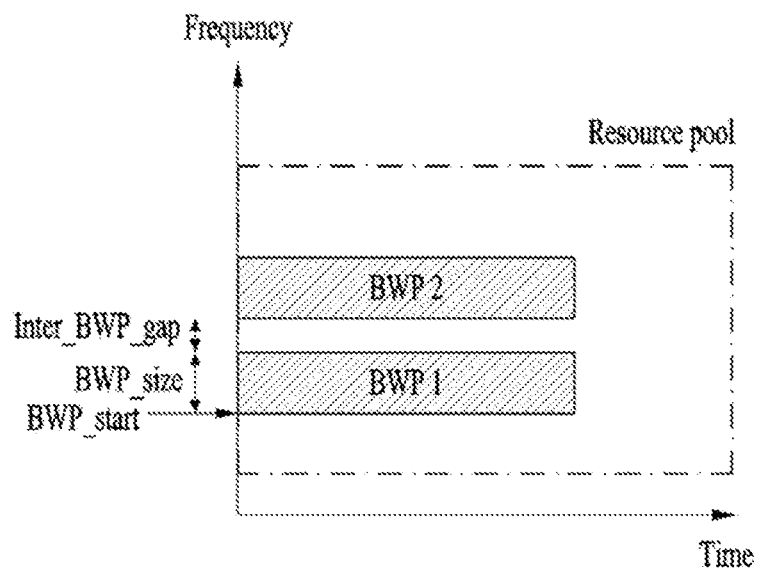
FIG. 21 is a diagram illustrating a BWP configuration method according to an embodiment of the present disclosure.

Referring to FIG. 21a, when a UE is configured with information about BWP_start, BWP_size, and inter_BWP_gap from a gNB, M-BWPs may be configured and allocated in a single resource pool. BWP_size may be configured for each of BWP 1 and BWP 2. Further, when the UE senses/selects valid resources to be used for data transmission, the UE senses/selects valid resources only in the given BWPs, BWP 1 and BWP 2 and uses the valid resources for data transmission.

Figure 21B:
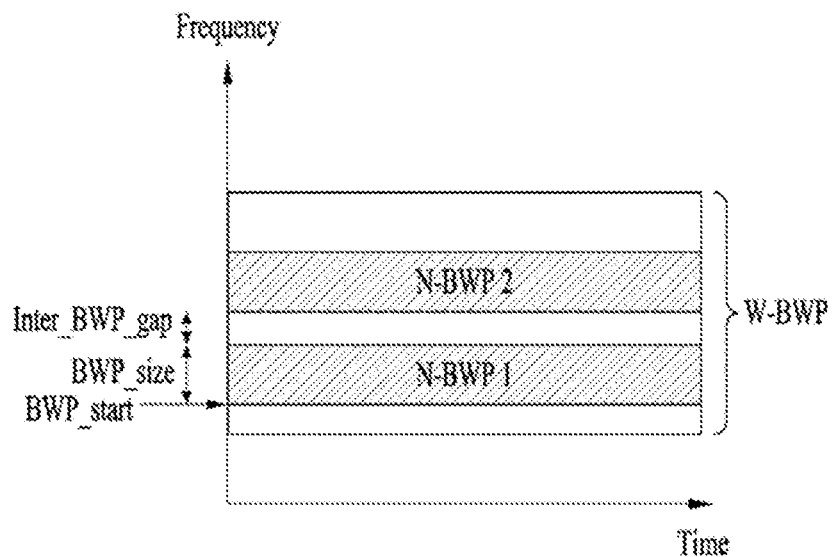

When it is assumed that a resource pool may be configured only within a BWP, the resource pool of FIG. 21a may also be configured for another BWP as illustrated in FIG. 21b. That is, the M-BWP allocation may also be applied, when a W-BWP and N-BWPs are configured together.

In FIG. 21b, a resource pool as large as a W-BWP may be configured for/allocated to a UE operating in the W-BWP, and a resource pool as large as an N-BWP may be configured for/allocated to a UE operating in the N-BWP. In other words, when a UE for which a W-BWP has been activated is configured with a resource pool, the size of the resource pool may be equal to that of the W-BWP. When a UE for which an N-BWP has been activated is configured with a resource pool, the size of the resource pool may be equal to that of the N-BWP. Since the N-BWP UE filters the N-BWP to be used by means of an RF filter, the UE needs a frequency gap for alleviating in-band emission that may occur between N-BWPs.

Further, when the N-BWP UE or the W-BWP UE is capable of forming sub-channel groups each including one or more consecutive sub-channels, a gap should be formed between the sub-channel groups. The presence or absence of the gap and the size of the gap may be configurable, and may be configured depending on whether an N-BWP UE exists. No data transmission may be performed in a part corresponding to the gap, that is, in frequency-domain/time-domain resources corresponding to the position of the gap, and the part may be excluded from a sensing and resource selection operation of the UE.

The size of a sub-channel group, that is, the number of sub-channels included in the sub-channel group may be set to be equal or different for the W-BWP and the N-BWP.

FIG. 22 is a diagram illustrating a method of configuring sub-channels in a BWP according to an embodiment of the present disclosure.

Figure 22A:
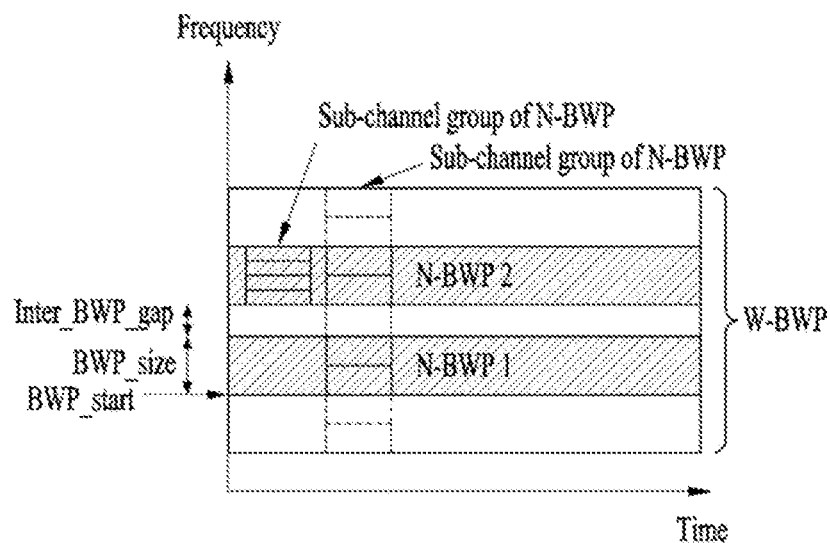
FIG. 22 is a diagram illustrating a method of configuring sub-channels in a BWP according to an embodiment of the present disclosure.

Referring to FIG. 22a, different sub-channel sizes may be configured for a W-BWP and an N-BWP. For this purpose, a gNB may preconfigure information such as {BWP_start, BWP_size, granularity} for each of the W-BWP and the N-BWP, for a UE. Granularity may be a value indicating the number of sub-channel groups configured in a BWP, which is used for configuring a resource pool. That is, the granularity may be a value indicating the number of sub-channel groups included in one W-BWP or one N-BWP.

Further, when transmitting SCI, the UE may also transmit information about a BWP type. The information about a BWP type may indicate whether the W-BWP or the N-BWP is used for SL communication. For example, SCI for N-BWP communication may include BWP type information indicating the N-BWP, and a TX-UE may indicate an N-BWP-based transmission to the RX-UE based on the SCI.

Upon receipt of this information in the SCI, a W-BWP RX-UE (i.e., a UE using the W-BWP) may decode UE information transmitted in the N-BWP from preconfigured {BWP_start, BWP_size, granularity} for the N-BWP.

Likewise, the W-BWP UE should be able to indicate W-BWP-based transmission in SCI, for W-BWP communication, and the N-BWP UE may decode information transmitted in the W-BWP by the W-BWP UE based on preconfigured {BWP_start, BWP_size, granularity} for the W-BWP.

Figure 22B:
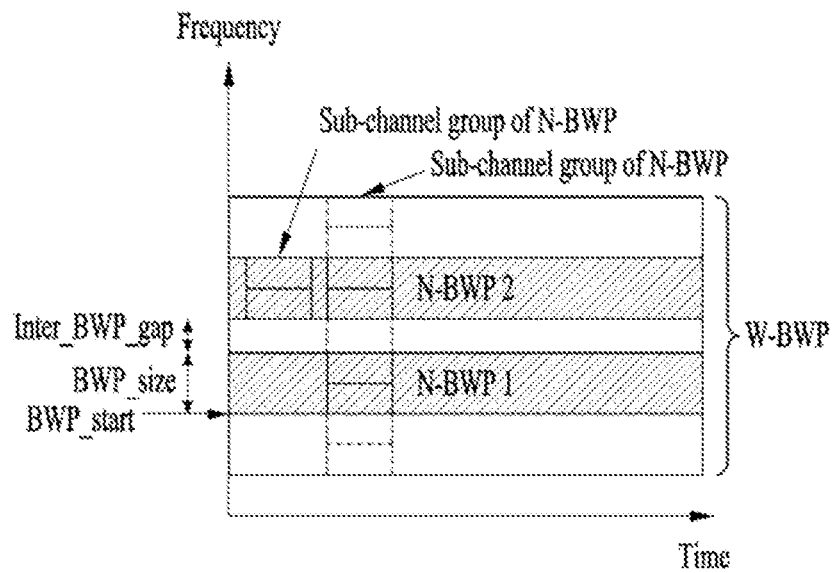

Referring to FIG. 22b, the same sub-channel group size may be configured for the W-BWP and the N-BWP. That is, the UE may use sub-channel groups of the same size irrespective of a BWP type (W-BWP/N-BWP). Accordingly, once the UEs have knowledge of {BWP_start, BWP_size} for each BWP and a sub-channel group size equal for all BWPs, the W-BWP UE and the N-BWP UE may communicate with each other.

In the above-described implementations of the present disclosure, the size of a gap configured for a UE, that is, the size of a gap between BWPs, configured by inter_BWP_gap may be an integer multiple of the size of a sub-channel or sub-channel group in the W-BWP. In other words, the size of a gap between N-BWPs may be set to an integer multiple of the size of a sub-channel or sub-channel group configured in the W-BWP.

According to another implementation of the present disclosure, the BS may allocate a BWP to a UE without considering a frequency gap between BWPs. In this case, the BS may indicate {BWP_start, BWP_size} information to the UE. That is, BWPs may be configured without a gap between the BWPs.

Figure 23:
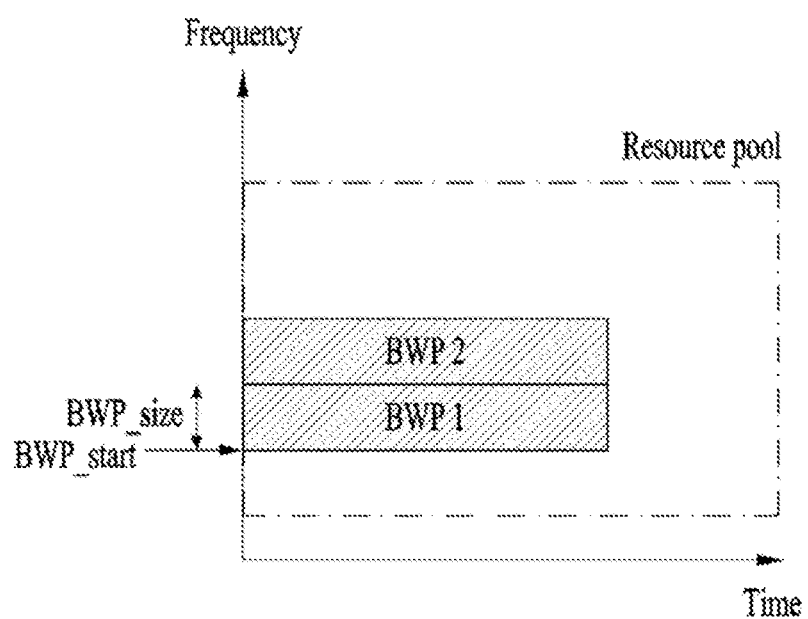
FIG. 23 is a diagram illustrating a BWP configuration method according to an embodiment of the present disclosure.

FIG. 23 is a diagram illustrating a BWP configuration method according to an embodiment of the present disclosure.

Referring to FIG. 23, when a UE is not configured with information about a gap between BWPs, the UE may interpret the size of the gap between BWPs as 0. In this case, BWP 2 may follow BWP 1 without any gap inbetween.

Alternatively, when the gNB does not configure a gap between BWPs, UEs communicating with each other may set the size of the gap, that is, the amount of resources corresponding to the gap. Alternatively, the size of a gap may be preconfigured according to the size of a BWP or a numerology used for the BWP. The size of the gap between BWPs may be an integer multiple of a sub-channel or sub-channel group in the W-BWP. As described before, the UE may not sense/select resources corresponding to a BWP boundary, that is, the gap, or even though the UE senses the resources, the UE may not select the resources.

According to another implementation of the present disclosure, when a frequency gap is located between N-BWPs configured in a limited W-BWP or when N-BWPs are arranged without considering a gap and then the gap is configured implicitly in terms of resource sensing/allocation, the UE or the gNB may activate/deactivate a BWP and the gap. This is because it may be favorable in terms of power consumption for an N-BWP UE to communicate only during some time period. That is, when a frequency gap is configured between N-BWPs in a resource pool, the UE may communicate in an N-BWP only during some time period.

FIG. 24 is a diagram illustrating a method of activating/deactivating a BWP and a gap according to an embodiment of the present disclosure.

Figure 24A:
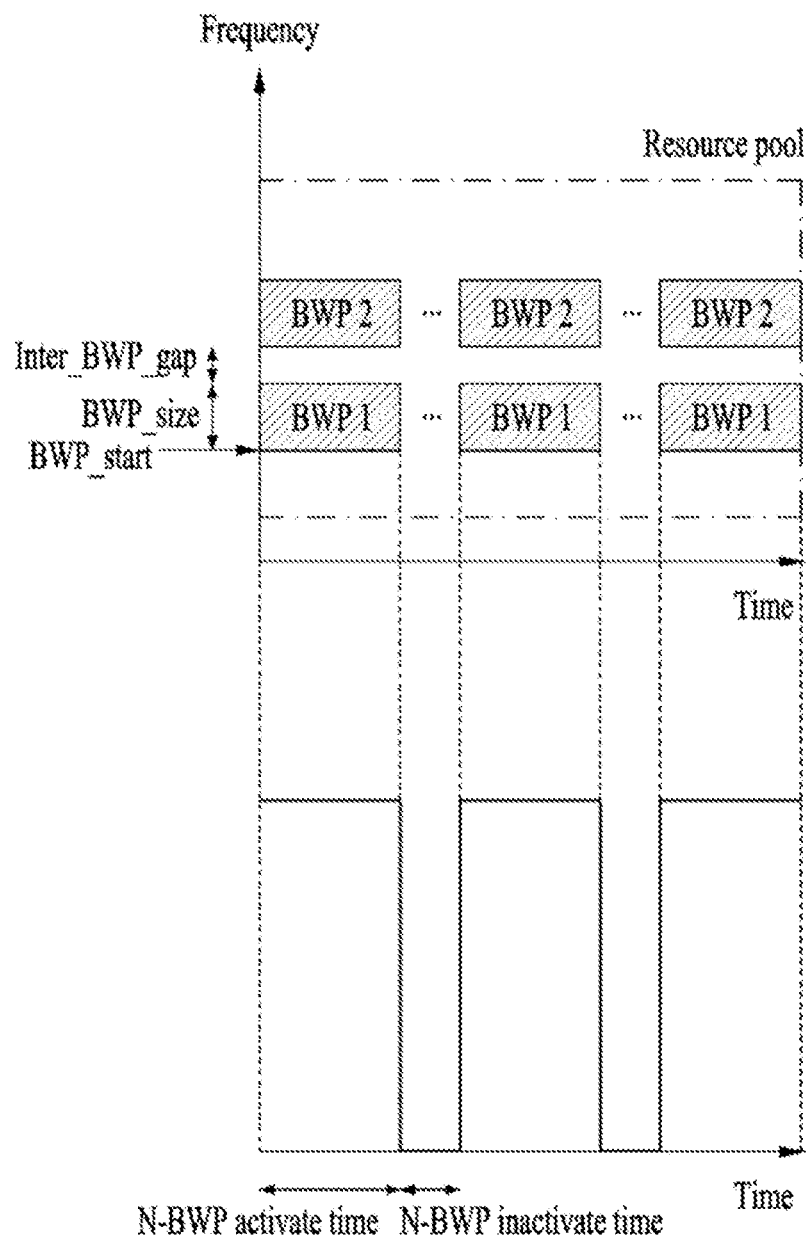
FIG. 24 is a diagram illustrating a method of activating/deactivating a BWP and a gap according to an embodiment of the present disclosure.
Figure 24B:
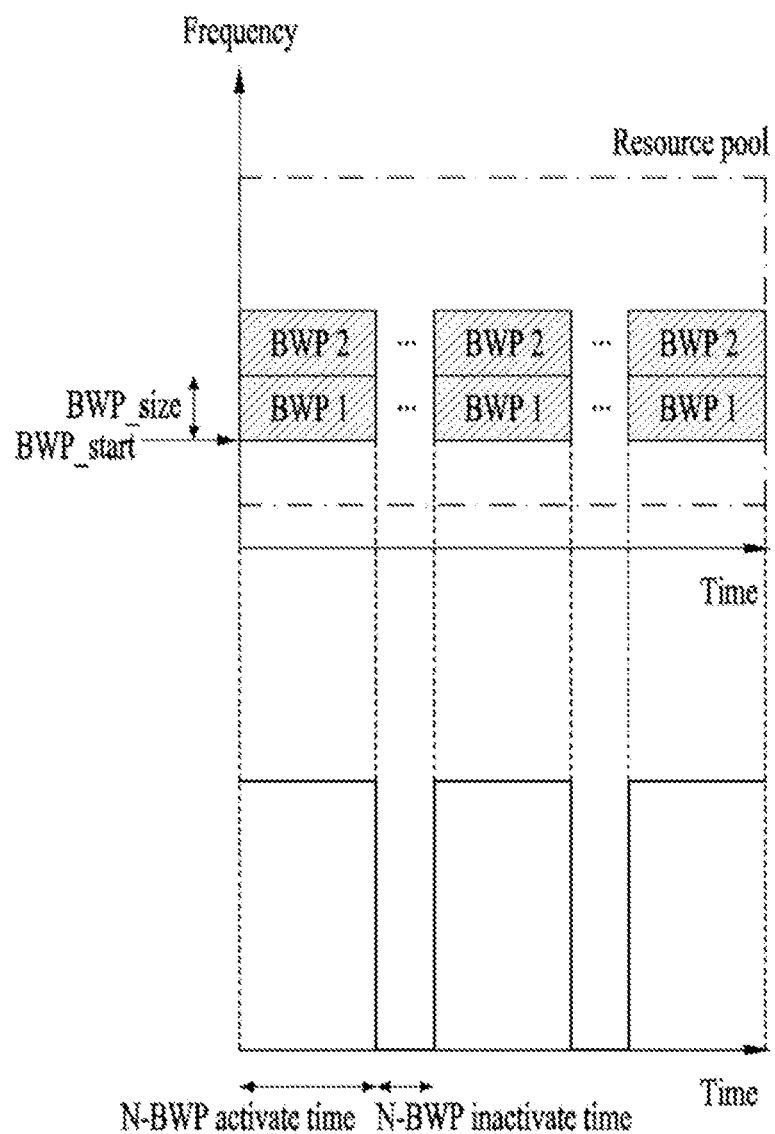

Referring to FIG. 24a, when a frequency gap is configured between N-BWPs, a UE may communicate in an N-BWP only during some time period. Alternatively, even when there is no gap between N-BWPs as illustrated in FIG. 24b, the UE may communicate in the N-BWP only during some time period. The length of a time period during the N-BWP is activated/deactivated, that is, the length of an N-BWP active time period or N-BWP inactive time period may be, for example, an integer multiple of the length of a slot. Additionally, the N-BWP may be activated/deactivated periodically or aperiodically.

1-2. Case of Forming Resource Pool in Each BWP

According to an implementation of the present disclosure, a resource pool may be configured in each BWP. The resource pool may be configured to be smaller than the BWP in consideration of a frequency gap between BWPs.

Figure 25:
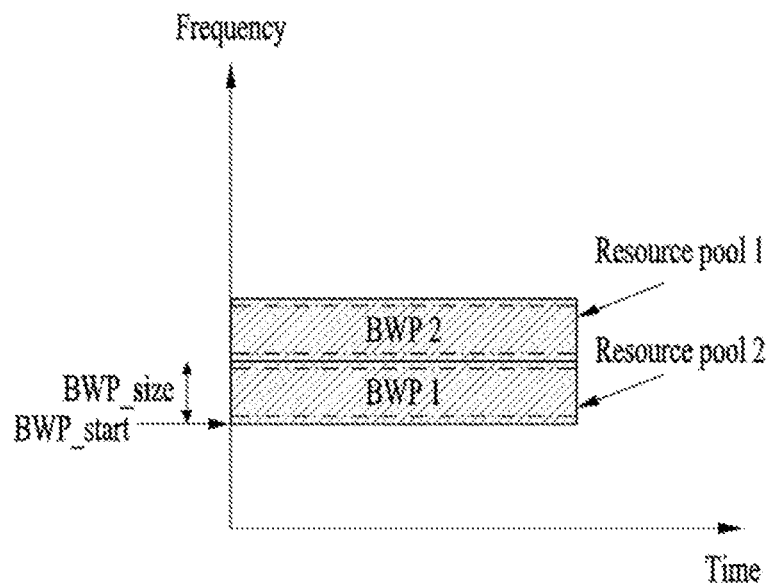
FIG. 25 is a diagram illustrating a resource pool configuration method according to an embodiment of the present disclosure.

FIG. 25 is a diagram illustrating a resource pool configuration method according to an embodiment of the present disclosure.

Referring to FIG. 25, resource pool 1 may be configured in BWP 1, and resource pool 2 may be configured in BWP 2. As described above, resource pool 1 and resource pool 2 may be configured to be smaller in size than BWP 1 and BWP 2, respectively. In this case, a UE may sense/select resources in a configured resource pool. Because a resource pool is configured independently for each BWP, the UE may sense/select resources in a different manner in each resource pool. For example, the UE may apply a different threshold to each resource pool in sensing/selecting resources in the resource pool.

According to another implementation of the present disclosure, a BWP size and a resource pool size may be equal for each BWP. Further, even though a resource pool is configured to be as large as a BWP, a guard gap may be separately configured between BWPs. In this case, when sensing/selecting resources in each resource pool, the UE may perform a sensing/selection operation in the remaining resources except for resources corresponding to the guard gap between BWPs.

Figure 26:
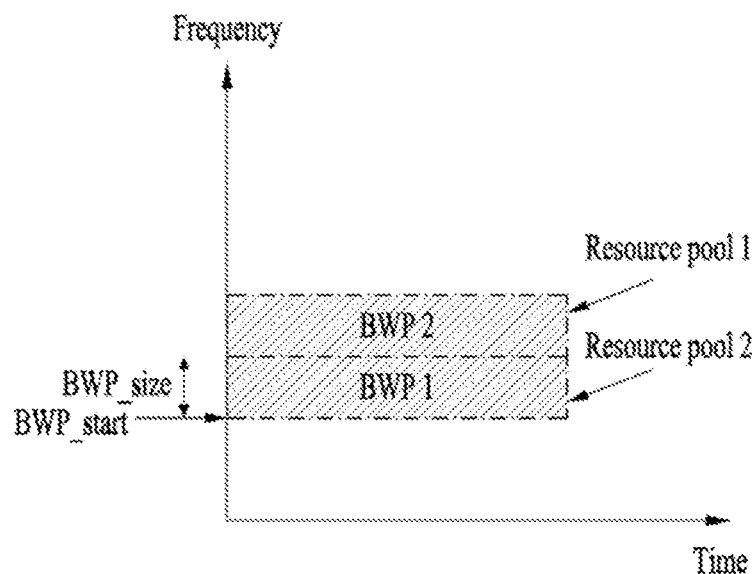
FIG. 26 is a diagram illustrating a resource pool configuration method according to another embodiment of the present disclosure.

FIG. 26 is a diagram illustrating a resource pool configuration method according to another embodiment of the present disclosure.

Referring to FIG. 26, for BWP 1 and BWP 2, resource pool 1 and resource pool 2 of the same sizes as those of respective BWP 1 and BWP 2 may be configured for a UE. In this case, the UE may sense/select resources in each resource pool of the same size as that of a corresponding BWP, without performing a sensing/selection operation on resources corresponding to a BWP boundary (e.g., a guard gap) or without selecting the resources even though the resources are sensed, as described before.

The amount of the resources corresponding to the BWP boundary may be configured between UEs communicating with each other. Alternatively, the size of a gap between BWPs may be preconfigured according to the size or numerology of a BWP. Further, a resource sensing/selection criterion for a resource pool may be different in each BWP.

2. UE-Specific BWP Configuration Method

When it is assumed that a BWP configured by the network or the like has been allocated over a wide frequency area and a W-BWP to be used for a UE has already been determined, there may be a need for configuring an N-BWP for unicast communication with a specific UE within the W-BWP. This is because when the UE performs unicast communication with the specific UE by configuring an N-BWP, in-band emission-caused signal distortion may be reduced. Alternatively, when one (or both) of UEs performing unicast communication is to operate in a power saving mode, it may also be necessary to configure an N-BWP. When an N-BWP is configured within the allocated W-BWP, each UE may adapt an RF filter according to the configured N-BWP to reduce the afore-described in-band emission and perform a power saving mode operation. In this case, where to configure the N-BWP in the W-BWP may become an issue.

Individual UEs may differ in bandwidth capability for transmission/reception. The W-BWP allocated by the network or the like may or may not exceed the bandwidth capability of each UE. In current NR, a different numerology may be used in each defined BWP. However, when an N-BWP is configured in the W-BWP, the same numerology may be used in the W-BWP and the N-BWP because the N-BWP is included in the W-BWP. This is because when different numerologies are used in the W-BWP and the N-BWP, ISI/ICI may occur to another UE using the W-BWP.

Various embodiments of a method of allocating an N-BWP in a W-BWP to reduce in-band emission and save power are disclosed in the present disclosure. Hereinbelow, a TX-UE and an RX-UE may refer to UEs communicating with each other in a unicast manner. The TX-UE may be a UE that initially transmits a discovery message, and the RX-UE may a UE receiving the discovery message.

2-1. Case of Preconfiguring (Basic/Default) Size/(Potential) Location of N-BWP

According to an embodiment of the present disclosure, the (basic/default) size of an N-BWP may be preconfigured. The basic/default size of the N-BWP may be preconfigured for UEs by the network or the gNB. Accordingly, configuration information about the basic/default size and location of the N-BWP may be known to both of a TX-UE and an RX-UE (e.g., the gNB may unilaterally transmit the information to the TX-UE and the RX-UE).

When the gNB or the network pre-locates the N-BWP as such, the N-BWP may be located at a position corresponding to an edge of the W-BWP. In the present disclosure, an edge may refer to resources spanning from a resource of the lowest frequency index to a resource of a specific frequency index in an ascending order or from a resource of the highest frequency index to a resource of a specific frequency index in a descending order, in the frequency resources of the W-BWP.

Accordingly, when a UE performs a W-BWP-based operation, the problem of resource fragmentation may be reduced. For example, when the N-BWP resides at any position in the W-BWP, a large data packet transmitted in the W-BWP may be fragmented or experience a transmission delay.

Figure 27A:
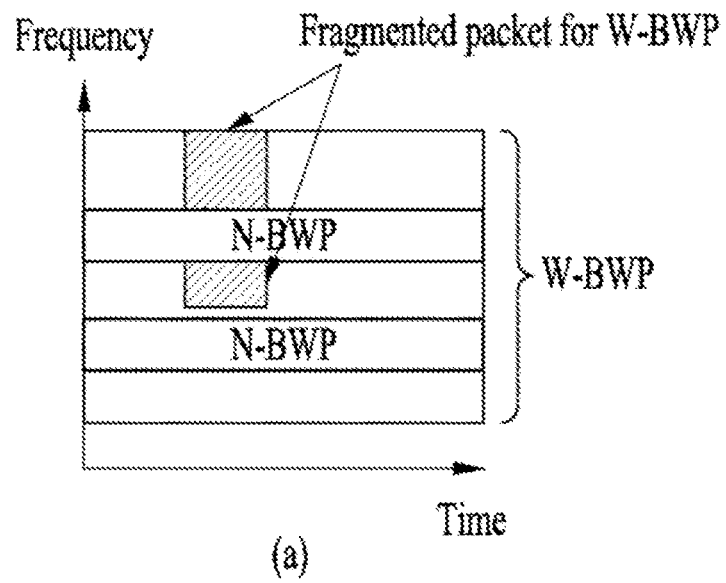
FIG. 27 is a diagram illustrating a narrow BWP (N-BWP) allocation method according to an embodiment of the present disclosure.
Figure 27B:
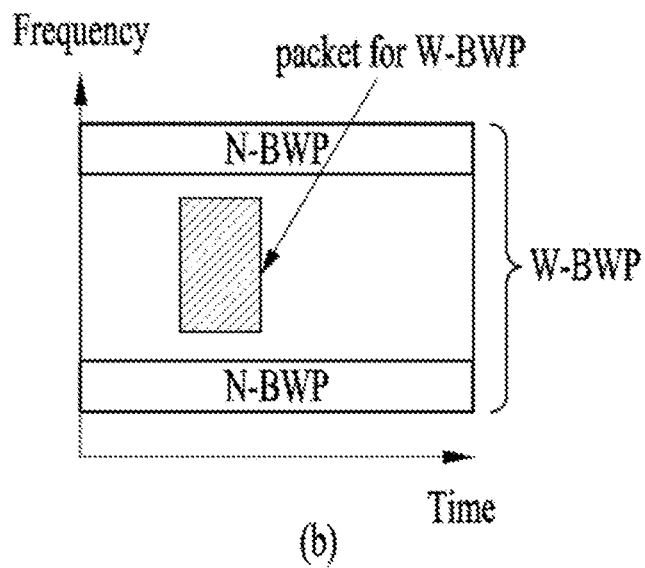

FIG. 27 is a diagram illustrating an N-BWP allocation method according to an embodiment of the present disclosure.

Referring to FIG. 27a, when N-BWPs are not located at edges of a W-BWP, a data signal transmitted in the W-BWP may be fragmented by the N-BWPs in the frequency domain. On the contrary, referring to FIG. SYb, when the N-BWPs are located at the edges of the W-BWP, a large data packet transmitted in the W-BWP may be less likely to be fragmented.

When the sizes or positions of N-BWPs are preconfigured as described before, the TX-UE/RX-UE may have prior knowledge of the priority of data to be transmitted in the N-BWPs. In other words, the TX-UE/RX-UE may be configured with information about the priority of data to be transmitted in the N-BWPs by the gNB or the network. The UE, which has been configured with the information about the priority of the data, may identify the state of each N-BWP.

A different N-BWP may be available to each UE according to a service type/service requirement/service entity/cast type (e.g., unicast, broadcast, groupcast, and so on). Further, the UE may select an N-BWP restrictively. For example, a UE with a good BWP capability may be restricted from using an N-BWP. Accordingly, the UE may perform an operation of identifying the state of an N-BWP within a given N-BWP-related configuration or only within selectable N-BWPs.

As described above, the positions and sizes of a plurality of N-BWPs in the W-BWP may be predetermined, and the UE may calculate an N-BWP candidate suitable for actual data transmission among the N-BWPs. Further, when the UE has knowledge of the priority of data to be transmitted in the N-BWPs as described before, the UE may identify the states of the N-BWPs as follows.

Interference Sensing-Based Method

The UE may measure the interference of each N-BWP during a sensing window and calculate the ratio of an interference measurement that does not exceed a predetermined threshold (i.e., the ratio of valid resources available for data transmission) on an N-BWP basis. The threshold may be configured differently according to the priority of transmission data.

CBR Measurement-Based Method

The UE may measure the CBR of each N-BWP. CBR measurement and congestion control may be performed independently for W-BWP-based SL communication and N-BWP-based SL communication.

The above-described operation of identifying the state of an N-BWP based on interference sensing or CBR measurement may be performed each of the TX-UE and the RX-UE. In view of the nature of an SL communication environment in which an operation such as beamforming is performed, values measured by the TX-UE and the RX-UE may be different.

According to the afore-described implementations of the present disclosure, the TX-UE/RX-UE may identify the states of the N-BWPs and then determine an N-BWP for subsequent data communication as follows.

First, when the TX-UE and the RX-UE are within the coverage of the gNB (in-coverage), and the gNB determines the positions of the N-BWPs, the TX-UE and the RX-UE may transmit information {UE RF capability, number of N-BWP candidates 1, 2, 3, . . . (and/or start point of each N-BWP candidate)} to the gNB. The number (and/or start points) of N-BWP candidates may be obtained based on the states of the N-BWPs identified by the afore-described interference sensing or CBR measurement of the UE. The UE may transmit the information about the number (and/or start points) of N-BWP candidates in a preference order. For example, the UE may transmit information about the start points of N-BWP candidates in the order of preferred N-BWP candidates.

The gNB may determine an N-BWP to be used for data transmission between the TX-UE and the RX-UE based on values of {UE RF capability, number of N-BWP candidates 1, 2, 3, . . . (and/or start point of each N_BWP candidate)} received from the TX-UE and the RX-UE, and indicate the determined N-BWP to the TX-UE and the RX-UE. In the presence of a plurality of N-BWP candidates preferred by the UEs, the gNB may determine a higher-priority N-BWP candidate or select an N-BWP candidate located at an edge of the W-BWP to reduce fragmented resources of the W-BWP, as described before.

In the absence of an N-BWP preferred by both of the TX-UE and the RX-UE based on the values of {UE RF capability, number of N-BWP candidates 1, 2, 3, . . . (and/or start point of each N_BWP candidate)} received from the TX-UE and the RX-UE, the gNB may select any N-BWP and indicate the selected N-BWP to the UEs. To reduce fragmented resources of the W-BWP even in this case, the gNB may a) select and indicate an N-BWP at an edge of the W-BWP, b) make the UEs use a preconfigured basic (or fallback) N-BWP, c) determine an N-BWP candidate preferred by either the TX-UE or the RX-UE and indicate the determined N-BWP candidate, d) determine an N-BWP candidate preferred by a UE with a smaller RF capability based on RF capability information and indicate the determined N-BWP candidate (in this case, even though an N-BWP is determined, there is no need for sensing available resources again), e) determine an N-BWP candidate preferred by a UE with a larger RF capability based on the RF capability information and indicate the determined N-BWP candidate (i.e., because the UE with the larger RF capability has sensed more N-BWP candidates, the UE with the larger RF capability is assumed to have more information), or f) determine an N-BWP to be used for the UEs based on a combination of a) to e).

When the TX-UE and the RX-UE are located outside the coverage of the gNB (out-coverage), the TX-UE or the RX-UE may determine the position of an N-BWP. In this case, it may take a long time for the TX-UE and the RX-UE to negotiate with each other to determine the N-BWP for communication.

Therefore, when the UEs are out of the coverage of the gNB, a UE with a larger/smaller RF capability may determine the position of the N-BWP on its own. In addition, when the UEs have the same RF capability, a UE having a lower/higher ID may independently determine the position of the N-BWP. When a UE shares information about {UE RF capability, number of N-BWP candidates 1, 2, 3, . . . (and/or start point of each N-BWP candidate)} without the right to determine an N-BWP, a UE having the decision right may determine an N-BWP to be used for communication based on this information according to its sensing result or (and) CBR information about N-BWP candidates.

2-2. Case of Preconfiguring No (Basic/Default) Size/(Potential) Location of N-BWP When the sizes or positions of N-BWPs are not predetermined, a required frequency width for an N-BWP to be used for UE-specific unicast communication, that is, a resource allocated to the N-BWP in the frequency domain may be determined as follows.

The basic size of the N-BWP may be predetermined.

The size of the N-BWP may be determined differently according to a data rate for transmission of a UE, a numerology determined for a W-BWP, a CBR, the RF capabilities of UEs to communicate with each other, and so on.

The size of the N-BWP may be determined and indicated unilaterally by the gNB or may be determined unilaterally by a TX-UE which will transmit data.

The width of an N-BWP or an area for the start point of the N-BWP, which is available for each UE, may be configured differently according to a service type/service requirement/service entity/cast type (unicast, broadcast, groupcast, and so on), and a frequency range available for the start position and width of the N-BWP may be limited. Alternatively, a UE with a good capability may be restricted from using the N-BWP. Accordingly, the UEs may perform an operation of identifying the state of an N-BWP within a given N-BWP-related configuration or only within selectable N-BWPs.

According to the above-described implementations of the present disclosure, when the frequency width of a required N-BWP and the priority of a service to be transmitted in the N-BWP are known to both the TX-UE and the RX-UE, each of the TX-UE and the RX-UE may perform available resource sensing or CBR measurement on a predetermined N-BWP unit basis during a certain time period (e.g., a sensing window) within a W-BWP period. The 'predetermined N-BWP unit' may refer to a size corresponding to an N-BWP to be actually used by a UE and a guard band in consideration of the effect of in-band emission. In addition, transmittable (available) resources may refer to resources with a measured interference level or CBR value smaller than a predetermined threshold. A sensed interference level or a CBR measurement criterion may be different according to the priority of a service to be transmitted. Further, the threshold may be different from a reference value used in the W-BWP.

A method of performing resource sensing/CBR measurement on a predetermined N-BWP width basis unit by a UE may be given as follows. While available resources (i.e., resources with an interference level less than or equal to a certain value) are sensed, by way of example, it is apparent that the same method is applicable to CBR measurement so that a UE may detect an N-BWP suitable for data transmission.

According to an implementation of the present disclosure, the UE may extract the amount of resources available in the entire W-BWP in a sliding window method using a predetermined N-BWP frequency width size on the frequency axis.

Figure 28:
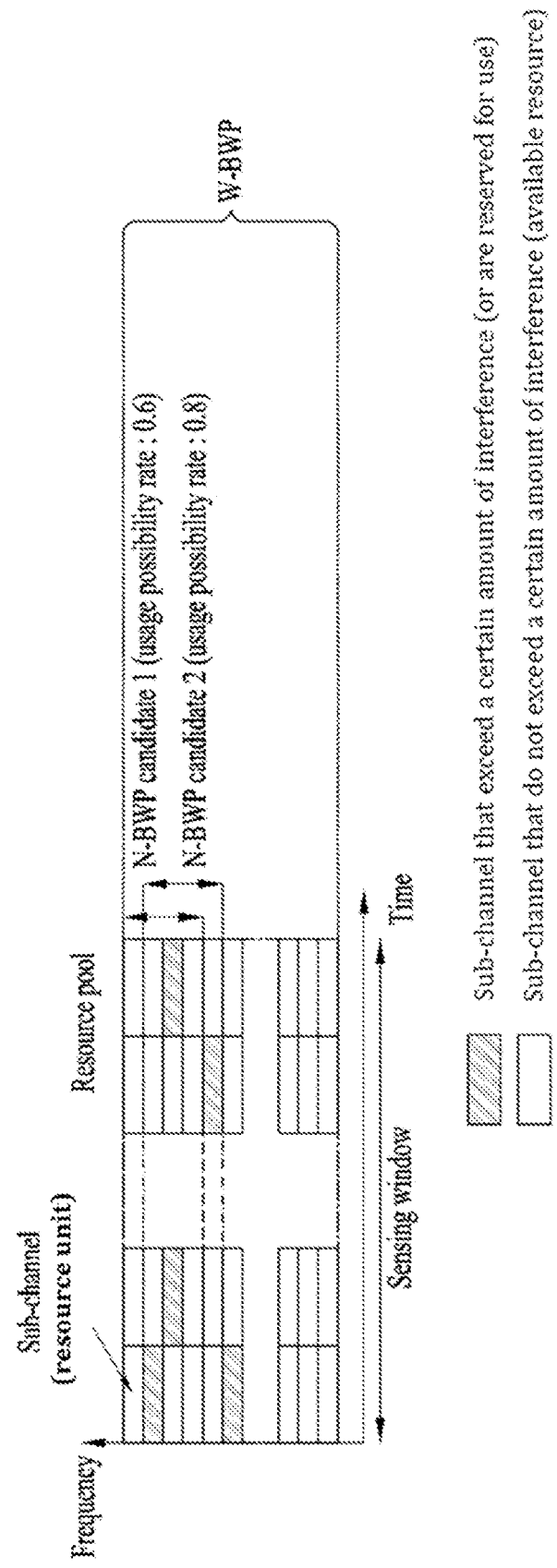
FIG. 28 is a diagram illustrating an N-BWP resource sensing method according to an embodiment of the present disclosure.

FIG. 28 is a diagram illustrating an N-BWP resource sensing method according to an embodiment of the present disclosure.

Referring to FIG. 28, a sliding window as large as an N-BWP width may be applied at intervals of a sub-channel (resource unit) on the frequency axis. When the amount of usable resources is 0.6 as a result of interference sensing of an area corresponding to N-BWP candidate 1, and the amount of usable resources is 0.8 as a result of interference sensing of an area corresponding to N-BWP candidate 2, the UE may determine N-BWP candidate 2 less affected by interference within an allocated area to be more suitable as an N-BWP for communication. The UE may repeatedly perform the above-described process on the entire W-BWP area at intervals of a sub-channel during a predetermined sensing window time. That is, the UE may perform interference sensing at intervals of a sub-channel from a frequency having a highest frequency index to a frequency having the lowest frequency index in the W-BWP, or from the frequency having the lowest frequency index to from the frequency having the highest frequency index in the W-BWP. According to the sub-channel interval-based sliding window method, an optimal N-BWP position may be detected.

Alternatively, according to another implementation of the present disclosure, the amount of resources available in the entire W-BWP area may be extracted on a predetermined N-BWP width basis on the frequency axis, rather than on a sub-channel basis. That is, unlike the sub-channel interval-based sliding window method, sensing may be performed on an N-BWP width basis during the sensing window time without overlap on the frequency axis.

Figure 29:
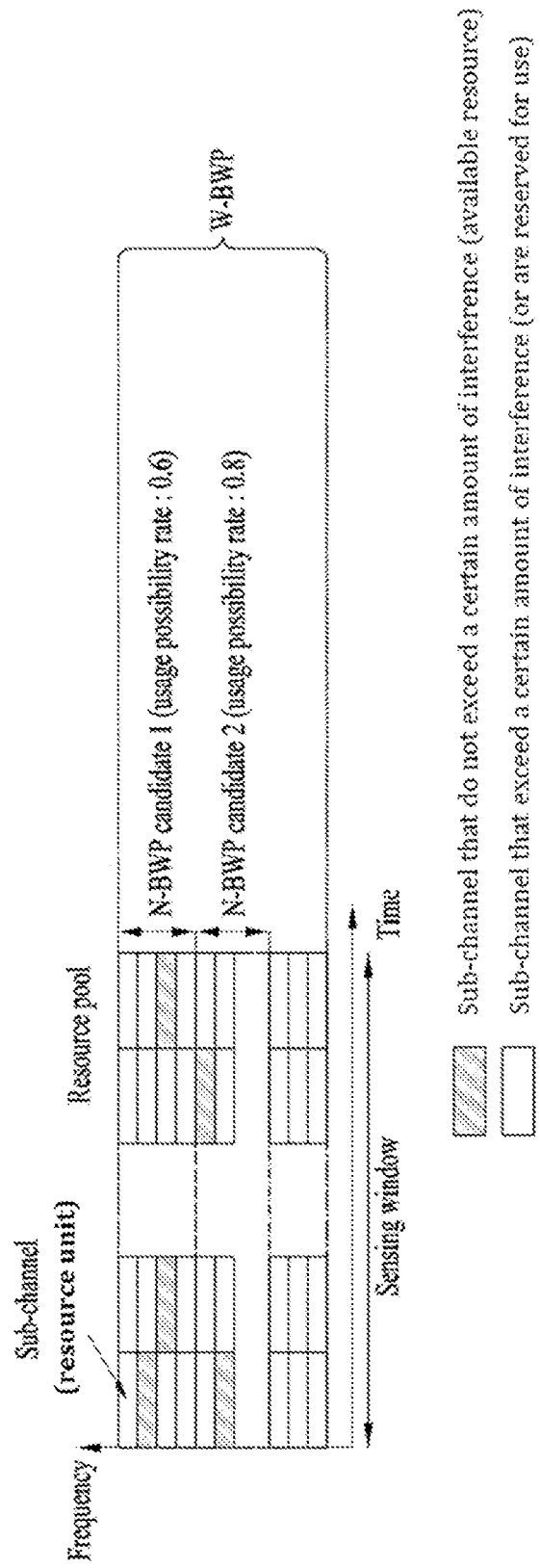
FIG. 29 is a diagram illustrating an N-BWP resource sensing method according to another embodiment of the present disclosure.

FIG. 29 is a diagram illustrating an N-BWP resource sensing method according to another embodiment of the present disclosure.

Referring to FIG. 29, N-BWP resource sensing may be performed on an N-BWP width basis in a W-BWP. That is, interference sensing for N-BWP candidate 1 and interference sensing for N-BWP candidate 2 may be performed without overlap in the frequency domain. In this case, a time required for sensing may be further shortened.

Alternatively, according to another implementation of the present disclosure, the above-described sub-channel interval-based or N-BWP width interval-based sensing method may be performed based on a width unit larger than the predetermined N-BWP width unit on the frequency axis. In this case, the time required to calculate a sensing value may be further shortened.

According to the above-described implementations of the present disclosure, suitable N-BWP positions calculated as a result of interference sensing/CBR measurement of the TX-UE and the RX-UE may be the same or different. Accordingly, a process of determining an N-BWP to be used for data communication may be additionally required.

First, when the TX-UE and the RX-UE are located within the coverage of the gNB, and the gNB determines the position of an N-BWP for communication between the UEs, the TX-UE and the RX-UE may transmit information about {UE RF capability, N-BWP start point 1, 2, 3, . . . } to the gNB. In this case, N-BWP start point information may be transmitted in a UE preference order, and this value may be calculated through the afore-mentioned interference sensing/CBR measurement.

The gNB may determine an N-BWP to be used for data transmission based on {UE RF capability, N-BWP candidate start point 1, 2, 3, . . . } values received from the TX-UE and the RX-UE, respectively, and indicate the determined N-BWP to the UEs. When there are multiple N-BWP candidates preferred by both of the UEs, the gNB may determine a higher-priority N-BWP or select an N-BWP candidate at an edge of the W-BWP, to reduce fragmented resources in the W-BWP, as described above.

In the absence of an N-BWP preferred by both of the TX-UE and the RX-UE based on the values of {UE RF capability, N-BWP candidate start point 1, 2, 3, . . . } received from the TX-UE and the RX-UE, the gNB may select any N-BWP and indicate the selected N-BWP to the UEs. To reduce fragmented resources of the W-BWP even in this case, the gNB may a) select and indicate an N-BWP at an edge of the W-BWP, b) make the UEs use a preconfigured basic (or fallback) N-BWP, c) determine an N-BWP candidate preferred by either the TX-UE or the RX-UE and indicate the determined N-BWP candidate, d) determine an N-BWP candidate preferred by a UE with a smaller RF capability based on RF capability information and indicate the determined N-BWP candidate (in this case, even though an N-BWP is determined, there is no need for sensing available resources again), e) determine an N-BWP candidate preferred by a UE with a larger RF capability based on the RF capability information and indicate the determined N-BWP candidate (i.e., because the UE with the larger RF capability has sensed more N-BWP candidates, the UE with the larger RF capability is assumed to have more information), or f) determine an N-BWP to be used for the UEs based on a combination of a) to e).

When the TX-UE and the RX-UE are located outside the coverage of the gNB (out-coverage) and the TX-UE or the RX-UE determines the position of an N-BWP, it may take a long time for the TX-UE and the RX-UE to negotiate with each other to determine an N-BWP for communication.

Therefore, when the UEs are out of the coverage of the gNB, a UE with a larger/smaller RF capability may determine the position of an N-BWP on its own. In addition, when the UEs have the same RF capability, a UE having a lower/higher ID may independently determine the position of the N-BWP. When a UE shares information about {UE RF capability, N-BWP candidate start point 1, 2, 3, . . . } without the right to determine an N-BWP, a UE having the decision right may determine an N-BWP to be used for communication based on this information according to its sensing result or (and) CBR information about N-BWP candidates.

2-3. Method of Performing Unicast through RF Adaptation Using Determined N-BWP

According to the present disclosure, the N-BWP determination method may be applied in an initialization stage. A discovery operation for a target UE may be performed in the W-BWP before unicast communication. Specifically, when a UE operates in the W-BWP, the UE may transmit a discovery message in the W-BWP since the position of an N-BWP is yet to be determined for data communication.

Unlike the method of selecting an N-BWP to be used for data communication based on measurements (e.g., interference sensing, CBR measurement, etc.) of the TX-UE and the RX-UE, the TX-UE transmitting a discovery message may determine an N-BWP to be used for data communication only based on its measurement to perform the discovery operation more effectively in consideration of an N-BWP configuration in the following implementations. In this case, since communication may be performed faster in the N-BWP, power may be saved or in-band emission may be reduced.

First, when the sizes or positions of N-BWPs are predetermined, the TX-UE selects a specific N-BWP based on its sensing operation (and/or) CBR measurement operation in a resource selection step for the discovery operation and transmits a discovery message in the specific N-BWP. Further, upon receipt of the discovery message, the RX-UE may consider the N-BWP carrying the received discovery message as a TX-UE-preferred N-BWP and perform a subsequent PC5 RRC CONNECTION message exchange and unicast data transmission/reception operation through RF bandwidth retuning to the N-BWP.

Alternatively, when the sizes or positions of N-BWPs are not predetermined, the TX-UE selects a specific N-BWP based on its sensing (and/or) CBR measurement in the resource selection step for discovery and transmits a discovery message in the N-BWP. In this case, information about {start point, width} of the specific N-BWP may be included in the discovery message. Alternatively, the N-BWP width may be a predetermined value known to both of the UEs.

Upon receipt of the discovery message, the RX-UE may identify the area of the N-BWP carrying the discovery message, and perform a subsequent PC5 CONNECTION and data transmission operation in the N-BWP, considering the N-BWP to be a TX-UE-preferred N-BWP. Alternatively, the TX-UE may transmit information about {start point, width} of an N-BWP preferred for the subsequent PC5 CONNECTION and data transmission operation regardless of the position at which the discovery message is transmitted. In this case, apart from the discovery message transmission, the PC5 RRC CONNECTION message exchange and unicast data transmission/reception operation may be performed by RF bandwidth retuning to an N-BWP which may be known from the information included in the discovery message (e.g., the information about the start point or width).

When an N-BWP is selected according to the above-described implementations, overhead required for N-BWP selection may be reduced, and the N-BWP may be determined and accessed more quickly.

Even in the case of UE-specific communication in an N-BWP for the purpose of saving power or mitigating in-band emission in a given W-BWP, periodic/aperiodic RF retuning to the W-BWP area may be required to receive information broadcast by the other UE. Alternatively, when a sensing result value related to a used N-BWP exceeds a predetermined threshold, the UE should be able to switch to another N-BWP, adjust the size of the N-BWP, or perform a W-BWP-based operation. The UE should be able to signal information about triggering and recommendation of a related operation to the other UE.

Particularly in the case of RF retuning from the N-BWP to the W-BWP, a time gap (or timing gap) is required and needs to be pre-indicated. Specifically, in a method of indicating a time gap for RF retuning according to the present disclosure, the UE may indicate an expected time gap duration and the number of slots from the current slot, after which the time gap is expected to occur, while performing unicast communication.

FIG. 30 is a diagram illustrating a method of configuring a time gap for RF retuning according to an embodiment of the present disclosure.

Referring to FIG. 30, a UE may piggyback information about the number of slots from a slot carrying a current packet, after which RF retuning occurs, to a currently transmitted packet during unicast communication. The same operation may be performed in the case of RF retuning to the W-BWP in an N-BWP RF tuned state or RF retuning to an N-BWP in a W-BWP RF tuned state. A number set in a communication block used for data transmission indicates the number of slots after which RF retuning occurs, as described above. The UE may indicate information about the time gap several slots earlier, for reliability.

2-4. N-BWP Determination Method in Case of UEs with Different RF Capabilities

When UEs communicating with each other have different RF capabilities (i.e., one UE is capable of sensing a W-BWP, but the other UE is capable of sensing only an N-BWP), an N-BWP to be used for the communication may be determined depending on a UE responsible for the determination.

Specifically, when the UE capable of sensing a W-BWP determines an N-BWP, the UE capable of sensing a wider BWP among the UEs performing communication may determine an N-BWP to be used for communication in the sliding window method. For example, the UE may randomly select a BWP from among BWPs with a lowest CBR/RSRP/interference level or BWPs with CBR/RSRP/interference levels equal to or less than a predetermined value in the frequency-axis sliding window method and indicate the selected BWP, that is, the BWP to be used for communication to the N-BWP-using UE by SCI.

Alternatively, when the UE capable of sensing a W-BWP determines a candidate N-BWP area in the above-described sliding window sensing method and indicates the candidate N-BWP area to the UE capable of sensing only an N-BWP by SCI, the UE capable of sensing only an N-BWP may perform communication by determining an N-BWP area to be used for communication based on information about the candidate N-BWP area.

When the UE capable of sensing only an N-BWP determines an N-BWP, the UE capable of sensing only an N-BWP senses a currently used N-BWP area or an initially allocated N-BWP. When a value such as an RSRP/CBR/interference level is equal to or larger than a certain value as a result of the sensing, the currently used N-BWP is used. Alternatively, when the value such as an RSRP/CBR/interference level is equal to or less than the certain value as a result of the sensing, or when link failure occurs a certain number of or more times, the UE may perform an operation to select another BWP instead of the currently used BWP. In this case, the UE capable of sensing only an N-BWP may sense the entire/partial W-BWP area in the above-described sliding window method and determine an N-BWP to be used for communication based on the sensing result (an RSRP/CBR/interference level), or may request an N-BWP candidate other than the currently used N-BWP to the UE capable of sensing a W-BWP. The UE capable of sensing a W-BWP may inform the UE capable of sensing only an N-BWP of an N-BWP (candidate) to be used for communication based on its sensing result.

Figure 31:
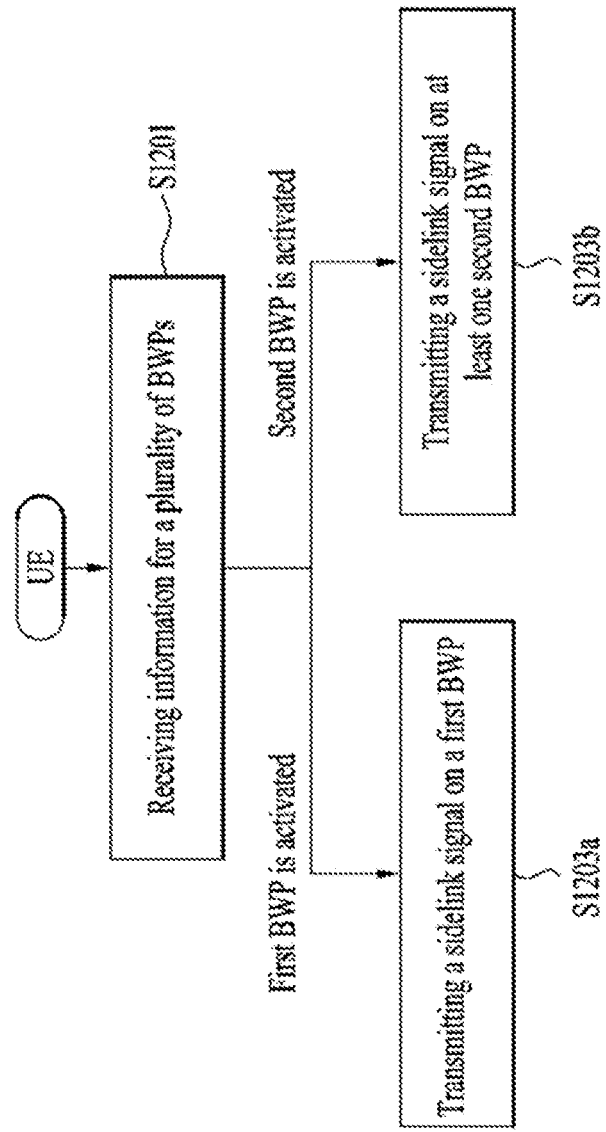
FIG. 31 is a flowchart illustrating an SL signal transmission method according to an embodiment of the present disclosure.

FIG. 31 is a flowchart illustrating an SL transmission method according to an embodiment of the present disclosure.

Referring to FIG. 31, a UE may receive allocation information about a plurality of BWPs from a BS in operation S1201. The plurality of BWPs may include a first BWP and a plurality of second BWPs included in the first BWP. The first BWP may correspond to the afore-described W-BWP of the present disclosure, and the second BWPs may correspond to the afore-described N-BWPs of the present disclosure.

The allocation information may include the start points of the first BWP and the plurality of second BWPs, the sizes of the first BWP and the plurality of second BWPs, and a gap between the plurality of second BWPs. That is, each of the plurality of second BWPs may be allocated at intervals of the gap from the start point of the second BWP in the frequency domain within the first BWP based on the allocation information.

The first BWP may include a first sub-channel group, and each of the plurality of second BWPs may include a second sub-channel group. Each of the first sub-channel group and the second sub-channel group may include a plurality of sub-channels. In this case, the allocation information may include the number of sub-channels included in the first sub-channel group and the number of sub-channels included in the second sub-channel group. The number of sub-channels included in the first sub-channel group and the number of sub-channels included in the second sub-channel group may be set to be equal or different.

In operation S1203$a$, based on the first BWP being activated, the UE may transmit an SL signal in the first BWP to another UE.

Alternatively, in operation S1203$b$, based on at least one of the plurality of second BWPs being activated, the UE may transmit the SL signal in the at least one second BWP to another UE.

Alternatively, the SL signal transmission method may further include receiving information about a resource pool for transmission of the SL signal. The information about the resource pool may include information (e.g., the number of sub-channels included in the resource pool, the size of a sub-channel, a first subframe indicator for the resource pool, and so on) required to configure the resource pool for the UE.

The resource pool may be periodically repeated in the time domain, and may be a set of resource units. Further, based on the first BWP being activated, the size of the resource pool may be equal to that of the first BWP in the frequency domain, and based on the second BWP being activated, the size of the resource pool may be equal to that of the second BWP in the frequency domain.

While the present disclosure has been described in the context of SL by way of example, various embodiments of the present disclosure may also be applied to communication between a BS and a UE corresponding to a Uu interface.

It is obvious that each of the examples of the proposed methods may also be included as one of various embodiments of the present disclosure, and thus each example may be regarded as a kind of proposed method. Although the proposed methods may be implemented independently, some of the proposed methods may be combined (or merged) and implemented. The methods proposed in the present disclosure have been described in the context of the 3GPP NR system for convenience of description, the scope of systems to which the proposed methods are applied may be extended to other systems in addition to the 3GPP NR system. For example, the proposed methods of the present disclosure may be extended and applied to D2D communication. Here, D2D communication refers to direct communication between UEs over a radio channel. Although the UE means a user terminal, a network equipment such as a BS may also be regarded as a kind of UE if the network equipment transmits and receives a signal according to UE-to-UE communication schemes. In addition, the proposed methods of the present disclosure may be limitedly applied to MODE 3 V2X operations (and/or MODE 4 V2X operations). For example, the proposed methods of the present disclosure may be limitedly applied to transmission of a preconfigured (and/or signaled) (specific) V2X channel (and/or signal) (e.g., PSSCH (and/or (related) PSCCH and/or PSBCH)). For example, the proposed methods of the present disclosure may be limitedly applied when a PSSCH and a PSCCH (related thereto) are transmitted such that they are located to be adjacent (and/or non-adjacent) (in the frequency domain) (and/or when transmission is performed based on the value (and/or range) of a preconfigured (and/or signaled) MCS (coding rate and/or RB). For example, the proposed methods of the present disclosure may be limitedly applied to MODE 3 (and/or MODE 4) V2X carriers (MODE 4 (and/or 3) SL (and/or UL) SPS carriers and/or MODE 4 (and/or 3) dynamic scheduling carriers). Moreover, the proposed methods of the present disclosure may be (limitedly) applied when the positions and/or number of synchronization signal (transmission (and/or reception)) resources (and/or the positions and/or number of subframes in a V2X resource pool (and/or the size and number of sub-channels)) are the same (and/or (partially) different) between carriers. For example, the proposed methods of the present disclosure may be extended and applied to (V2X) communication between a BS and a UE. For example, the proposed methods of the present disclosure may be limitedly applied to unicast (SL) communication (and/or multicast (or groupcast) (SL) communication and/or broadcast (SL) communication).

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 32:
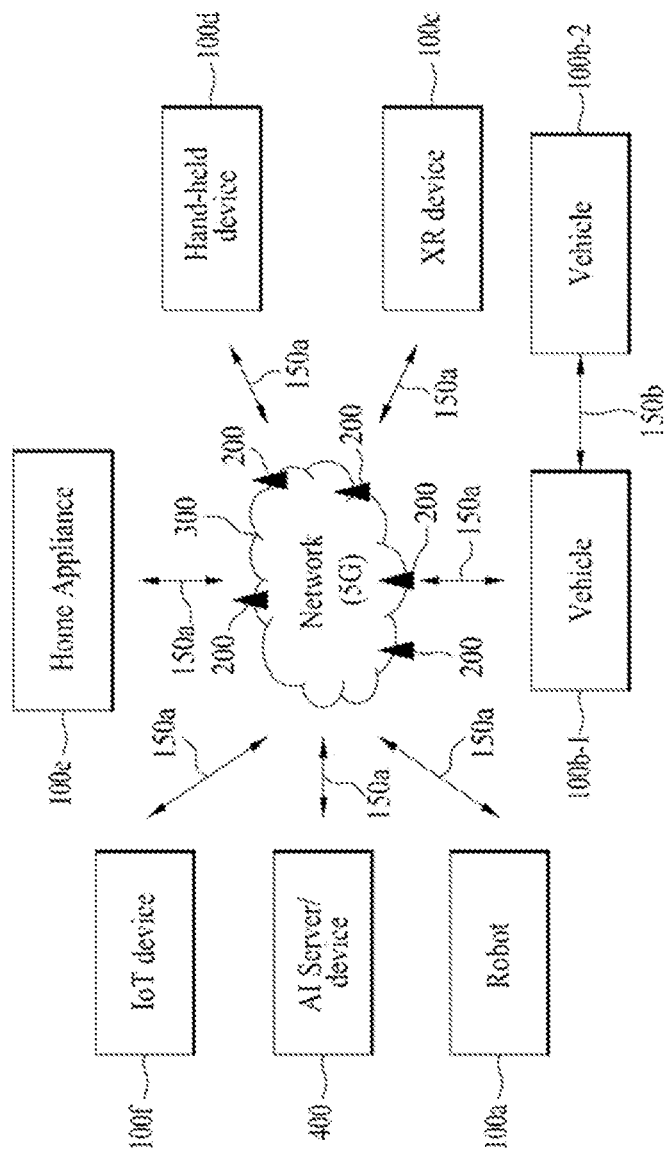
FIGS. 32 to 38 are block diagrams illustrating various devices applicable to embodiment(s) of the present disclosure.

FIG. 32 illustrates a communication system 1 applied to the present disclosure.

Referring to FIG. 32, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 33:
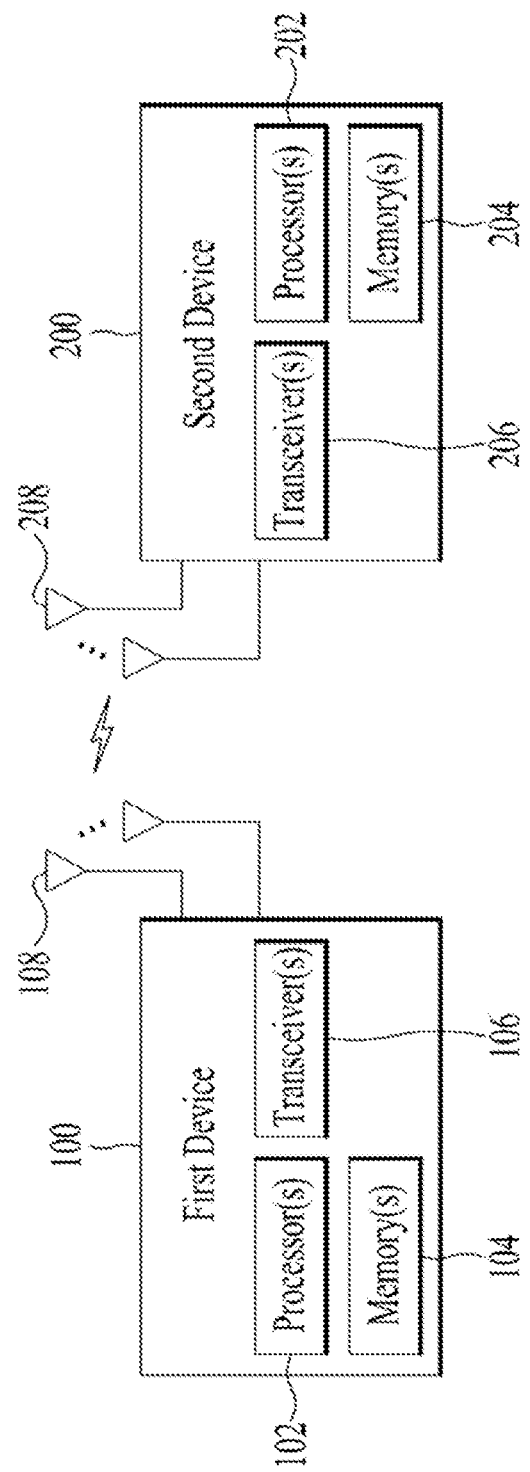

FIG. 33 illustrates wireless devices applicable to the present disclosure.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 34:
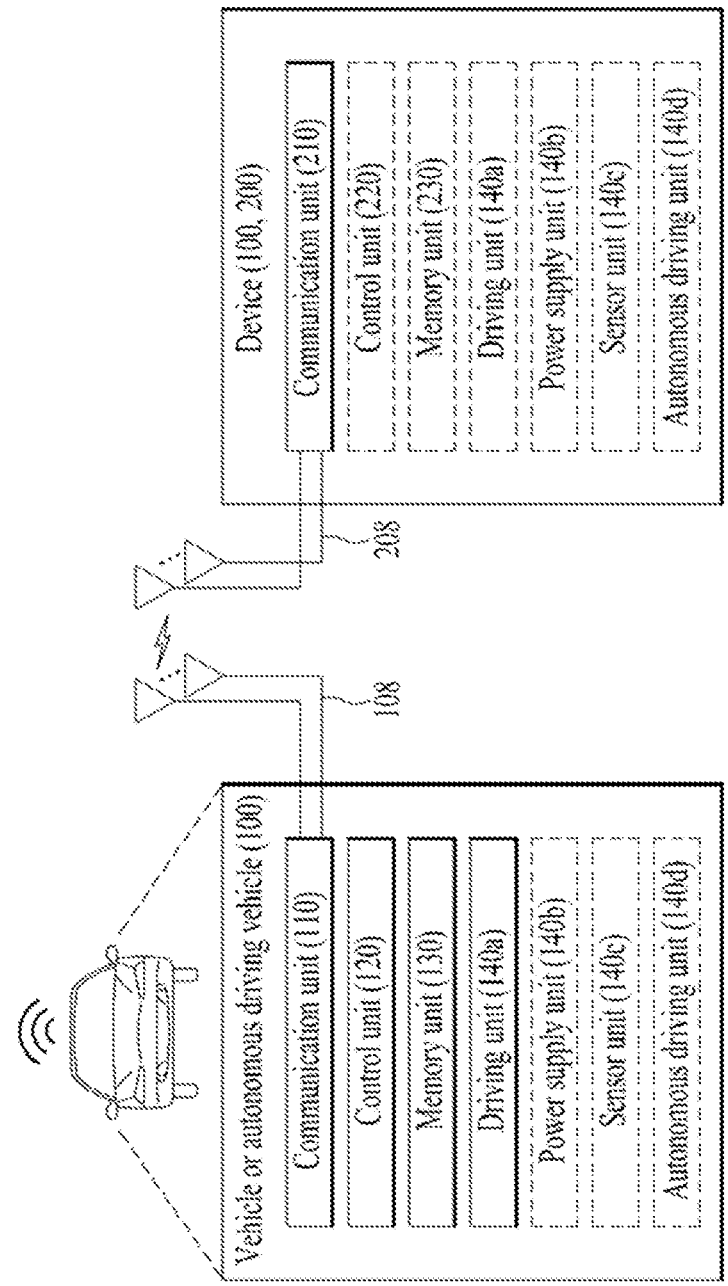

Example of a Vehicle or an Autonomous Driving Vehicle to which the Present Disclosure is Applied FIG. 34 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 34, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 32, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 35:
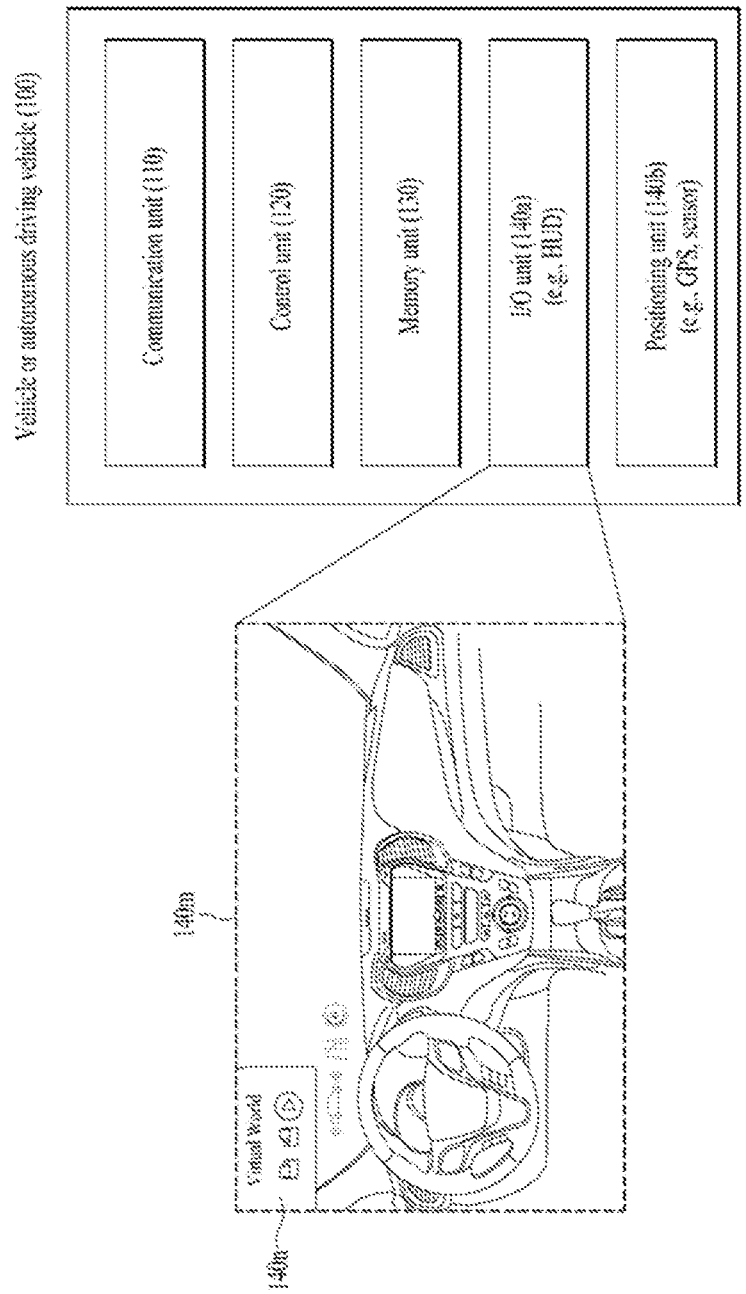

FIG. 35 illustrates a vehicle applied to the present disclosure. The vehicle may be implemented as a transport means, an aerial vehicle, a ship, etc.

Referring to FIG. 35, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 36:
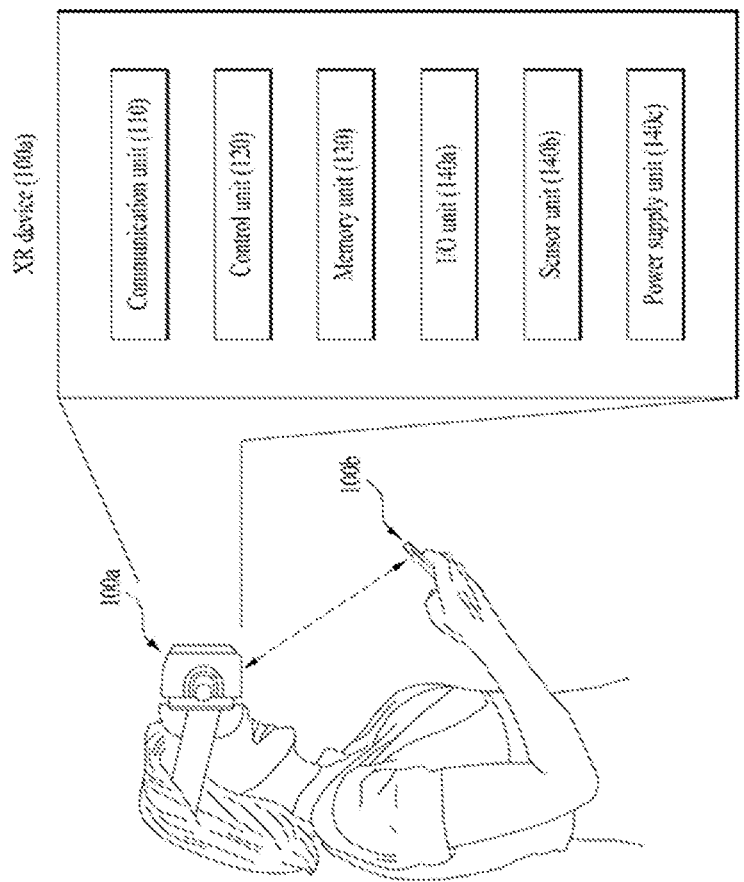

FIG. 36 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 36, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of Robot to which the Present Disclosure is Applied

Figure 37:
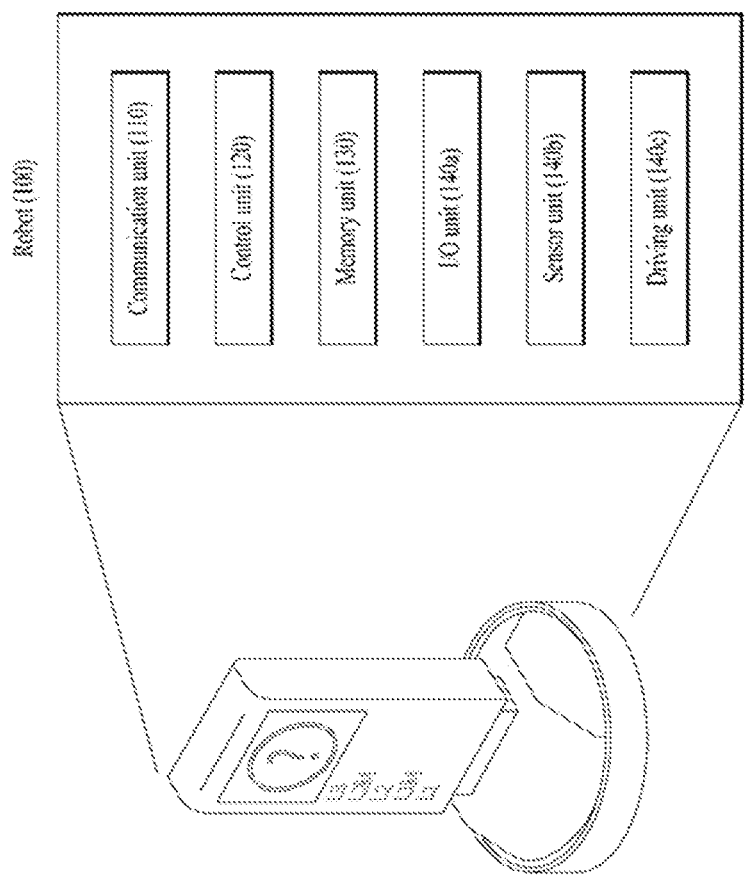

FIG. 37 illustrates a robot applied to the present disclosure. The robot may be categorized into an industrial robot, a medical robot, a household robot, a military robot, etc., according to a used purpose or field.

Referring to FIG. 50, a robot 100 may include a communication unit 110, a control unit 120, a memory unit 130, an I/O unit 140*a*, a sensor unit 140*b*, and a driving unit 140*c*.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of AI Device to which the Present Disclosure is Applied

Figure 38:
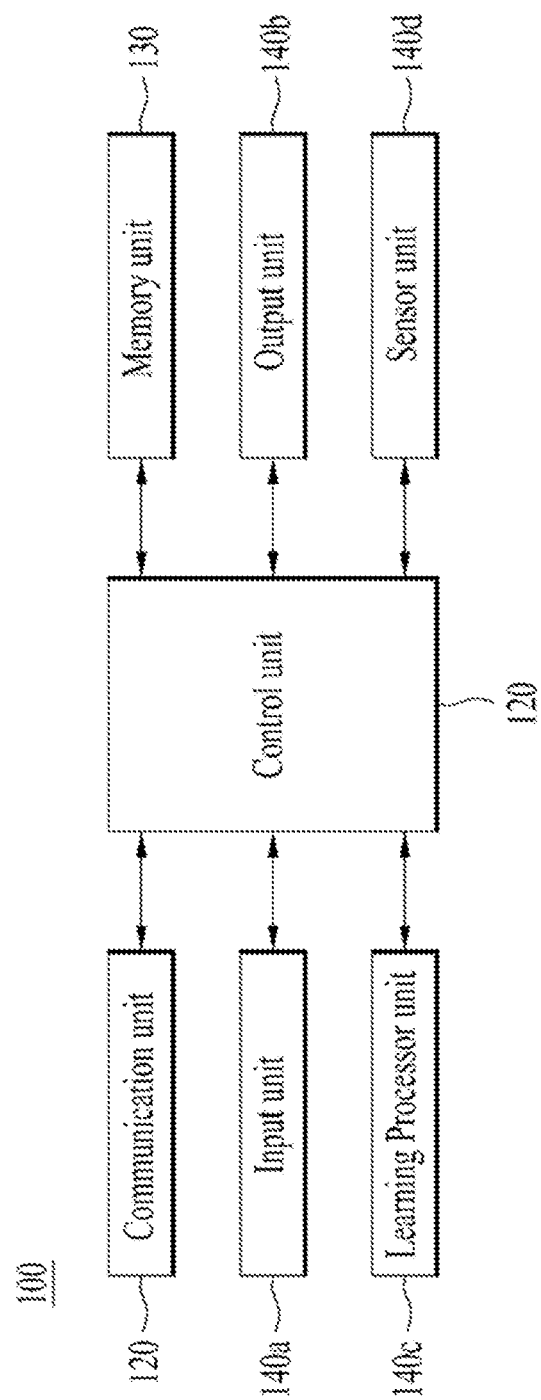

FIG. 38 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 38, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100x, 200, or 400 of FIG. 32) or an AI server (e.g., 400 of FIG. 32) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 32). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 32). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method of a user equipment (UE) in a wireless communication system, the method comprising:
receiving allocation information about bandwidth parts (BWPs), the BWPs including a first BWP and second BWPs included in the first BWP;
based on the first BWP being activated, transmitting a signal in the first BWP; and
based on at least one of the second BWPs being activated, transmitting the signal in the at least one second BWP,
wherein the allocation information includes start points of the first BWP and the second BWPs, sizes of the first BWP and the second BWPs, and a frequency gap between the second BWPs, and
wherein the second BWPs are allocated in a frequency domain within the first BWP such that an interval between the starting points of the second BWPs comprises a size of a second BWP and the frequency gap.

2. The method according to claim 1, further comprising:
receiving information about a resource pool for transmission of the signal, wherein the resource pool is repeated periodically in a time domain.

3. The method according to claim 2,
wherein based on the first BWP being activated, a frequency-domain size of the resource pool is equal to a frequency-domain size of the first BWP, and
wherein based on the second BWP being activated, a frequency-domain size of the resource pool is equal to a frequency-domain size of the second BWP.

4. The method according to claim 1,
wherein the first BWP includes a first sub-channel group, and each of the second BWPs includes a second sub-channel group, and
wherein each of the first sub-channel group and the second sub-channel group includes a plurality of sub-channels.

5. The method according to claim 4, wherein the allocation information includes the number of sub-channels included in the first sub-channel group, and the number of sub-channels included in the second sub-channel group.

6. The method according to claim 4, wherein the number of sub-channels included in the first sub-channel group is equal to the number of sub-channels included in the second sub-channel group.

7. An apparatus for a user equipment (UE) in a wireless communication system, the apparatus comprising:
at least one processor; and
at least one memory operably coupled to the at least one processor and storing instructions which cause the at least one processor to perform operations, wherein the operations include:
receiving allocation information about bandwidth parts (BWPs), the BWPs including a first BWP and a second BWPs included in the first BWP;
based on the first BWP being activated, transmitting a signal in the first BWP; and
based on at least one of the second BWPs being activated, transmitting the signal in the at least one second BWP,
wherein the allocation information includes start points of the first BWP and the second BWPs, sizes of the first BWP and the second BWPs, and a frequency gap between the plurality of second BWPs, and
wherein the second BWPs are allocated in a frequency domain within the first BWP such that an interval between the starting points of the second BWPs comprises a size of a second BWP and the frequency gap.

8. The apparatus according to claim 7,
wherein the operations further include receiving information about a resource pool for transmission of the sidelink signal, and
wherein the resource pool is repeated periodically in a time domain.

9. The apparatus according to claim 8,
wherein based on the first BWP being activated, a frequency-domain size of the resource pool is equal to a frequency-domain size of the first BWP, and
wherein based on the second BWP being activated, a frequency-domain size of the resource pool is equal to a frequency-domain size of the second BWP.

10. The apparatus according to claim 7,
wherein the first BWP includes a first sub-channel group, and each of the second BWPs includes a second sub-channel group, and
wherein each of the first sub-channel group and the second sub-channel group includes a plurality of sub-channels.

11. The apparatus according to claim 10, wherein the allocation information includes the number of sub-channels included in the first sub-channel group, and the number of sub-channels included in the second sub-channel group.

12. The apparatus according to claim 7, wherein the UE is an autonomous driving vehicle or is included in an autonomous driving vehicle.

13. A processor for performing operations for a user equipment (UE) in a wireless communication system,
wherein the operations include:
receiving allocation information about bandwidth parts (BWPs), the BWPs including a first BWP and a second BWPs included in the first BWP;
based on the first BWP being activated, transmitting a signal in the first BWP; and
based on at least one of the second BWPs being activated, transmitting the signal in the at least one second BWP,
wherein the allocation information includes start points of the first BWP and the second BWPs, sizes of the first BWP and the second BWPs, and a frequency gap between the second BWPs, and
wherein the second BWPs are allocated in a frequency domain within the first BWP such that an interval between the starting points of the second BWPs comprises a size of a second BWP and the frequency gap.

14. A non-transitory computer-readable storage medium storing at least one computer program including at least one instruction which, when executed by at least one processor, causes the at least one processor to perform operations for a user equipment (UE),
wherein the operations include:
receiving allocation information about bandwidth parts (BWPs), the BWPs including a first BWP and a second BWPs included in the first BWP;
based on the first BWP being activated, transmitting a signal in the first BWP; and
based on at least one of the second BWPs being activated, transmitting the signal in the at least one second BWP,
wherein the allocation information includes start points of the first BWP and the second BWPs, sizes of the first BWP and the second BWPs, and a frequency gap between the second BWPs, and
wherein the second BWPs are allocated in a frequency domain within the first BWP such that an interval between the starting points of the second BWPs comprises a size of a second BWP and the frequency gap.

* * * * *